United States Patent
Fujimoto

(10) Patent No.: US 11,074,713 B2
(45) Date of Patent: Jul. 27, 2021

(54) RECOGNITION DEVICE, RECOGNITION SYSTEM, RECOGNITION METHOD, AND NON-TRANSITORY COMPUTER READABLE RECORDING MEDIUM

(71) Applicant: FUJITSU LIMITED, Kawasaki (JP)

(72) Inventor: Hiroaki Fujimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 112 days.

(21) Appl. No.: 16/597,174

(22) Filed: Oct. 9, 2019

(65) Prior Publication Data

US 2020/0043194 A1 Feb. 6, 2020

Related U.S. Application Data

(63) Continuation of application No. PCT/JP2017/014721, filed on Apr. 10, 2017.

(51) Int. Cl.
*G06T 7/73* (2017.01)
*G06K 9/00* (2006.01)

(52) U.S. Cl.
CPC ............ *G06T 7/73* (2017.01); *G06K 9/00228* (2013.01); *G06T 2207/30196* (2013.01)

(58) Field of Classification Search
CPC ............ G06T 7/73; G06T 2207/30196; G06T 2207/30221; G06T 2207/10024;
(Continued)

(56) References Cited

U.S. PATENT DOCUMENTS

| 2010/0111370 A1* | 5/2010 | Black | G06K 9/00369 382/111 |
| 2010/0197400 A1* | 8/2010 | Geiss | G06K 9/00369 463/32 |
| 2013/0084982 A1 | 4/2013 | Suzuki | |
| 2013/0195330 A1* | 8/2013 | Kim | G06K 9/00201 382/128 |

(Continued)

FOREIGN PATENT DOCUMENTS

| JP | 2011-248525 A | 12/2011 |
| JP | 2012-000165 A | 1/2012 |

(Continued)

OTHER PUBLICATIONS

EESR—Extended European Search Report dated Apr. 2, 2020 for European Patent Application No. 17905269.1.

(Continued)

*Primary Examiner* — Wesley J Tucker
(74) *Attorney, Agent, or Firm* — Fujitsu Patent Center

(57) ABSTRACT

A recognition device a first recognition unit, a second recognition unit, and a third recognition unit. The first recognition unit acquires image information of a target person, and determines, based on a first discriminator and a feature in the image information, a first range corresponding to the image information of the target person. The second recognition unit acquires distance information of the target person, and determines, based on a second discriminator and a feature in the distance information, a second range corresponding to the distance information of the target person. The third recognition unit determines, based on the first range determined by the first recognition unit and the second range determined by the second recognition unit, a direction that a body of the target person is facing, and recognizes, based on the determined direction and a joint position dictionary, a skeleton of the target person.

9 Claims, 25 Drawing Sheets

(58) Field of Classification Search
CPC .......... G06T 2207/10028; G06T 2207/20081; G06K 9/00228
See application file for complete search history.

(56) References Cited

U.S. PATENT DOCUMENTS

| | | | | |
|---|---|---|---|---|
| 2013/0230211 | A1* | 9/2013 | Tanabiki | G06T 7/75 382/103 |
| 2013/0322720 | A1* | 12/2013 | Hu | G06T 7/50 382/131 |
| 2013/0342527 | A1* | 12/2013 | Molyneaux | G06T 17/20 345/419 |
| 2015/0320343 | A1 | 11/2015 | Utsunomiya et al. | |
| 2017/0251953 | A1* | 9/2017 | Fujimoto | A61B 5/1079 |
| 2020/0034659 | A1* | 1/2020 | Sato | G06T 7/00 |
| 2020/0098177 | A1* | 3/2020 | Ni | G06T 7/50 |
| 2020/0193614 | A1* | 6/2020 | Tadi | G06N 5/003 |
| 2020/0302621 | A1* | 9/2020 | Kong | G06T 7/75 |
| 2021/0074018 | A1* | 3/2021 | Xi | G06T 7/143 |

FOREIGN PATENT DOCUMENTS

| | | |
|---|---|---|
| JP | 2014-136137 A | 7/2014 |
| WO | 2011/158599 A1 | 12/2011 |
| WO | 2012/046392 A1 | 4/2012 |

OTHER PUBLICATIONS

S. Azrour et al.,"Leveraging Orientation Knowledge to Enhance Human Pose Estimation Methods", Jul. 2, 2016 (Jul. 2, 2016), International Conference on Financial Cryptography and Data Security; [Lecture Notes in Computer Science; Lect. Notes Computer], Springer, Berlin, Heidelberg, pp. 81-87, XP047350331.

S. Mukherjee et al.,"Deep Head Pose: Gaze-Direction Estimation in Multimodal Video", IEEE Transactions on Multimedia, IEEE Service Center, Piscataway, NJ, US, vol. 17, No. 11, Nov. 1, 2015 (Nov. 1, 2015), pp. 2094-2107, XP011588123.

International Search Report for corresponding International Application No. PCT/JP2017/014721, 9 pages.

* cited by examiner

FIG.7

DIRECTION PROBABILITY HOLDING TABLE (133)

133a:

| DIRECTION | 0 | 30 | 60 | 90 | 120 | 150 | 180 | 210 | 240 | 300 | 330 |
|---|---|---|---|---|---|---|---|---|---|---|---|
| PROBABILITY VALUE | 0 | 0 | 0 | 0.2 | 0.2 | 0.2 | 0.2 | 0.2 | 0.2 | 0.2 | 0 |

133b:

| DIRECTION | 0 | 30 | 60 | 90 | 120 | 150 | 180 | 210 | 240 | 300 | 330 |
|---|---|---|---|---|---|---|---|---|---|---|---|
| PROBABILITY VALUE | 0.2 | 0.5 | 0.2 | 0 | 0 | 0 | 0 | 0 | 0 | 0 | 0 |

| |
|---|
| ... |
| 180° |
| 240° |
| 300° |
| 0° |
| |

FIG.13
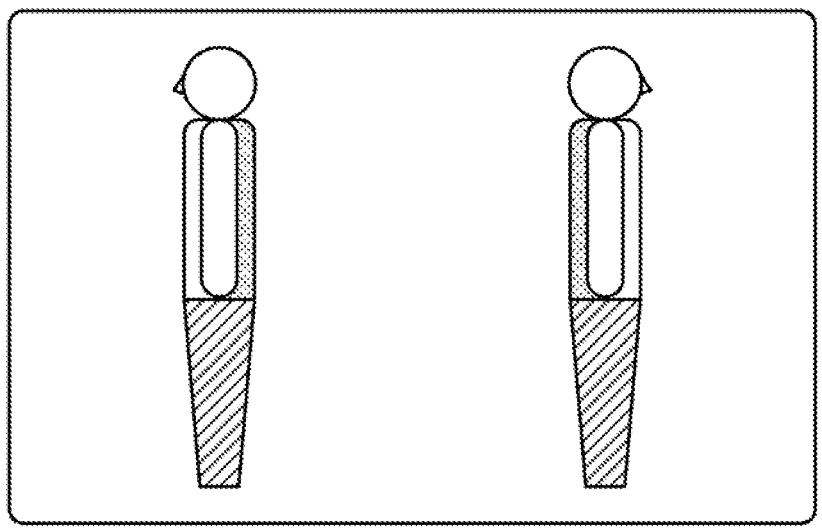
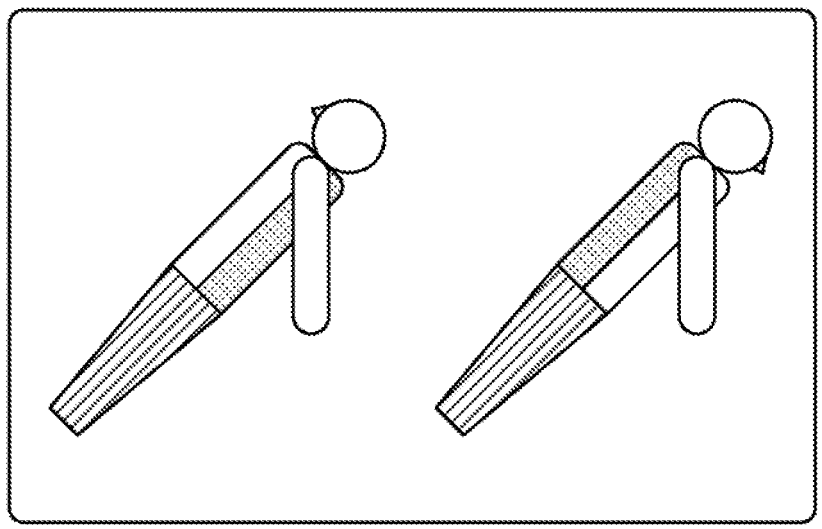
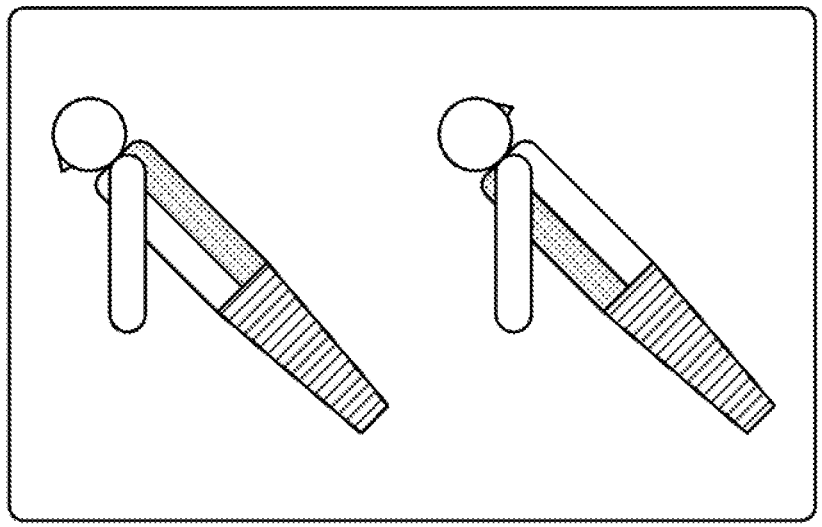

| DIRECTION | 0 | 30 | 60 | 90 | 120 | 150 | 180 | 210 | 240 | 300 | 330 |
|---|---|---|---|---|---|---|---|---|---|---|---|
| PROBABILITY VALUE | 0.2 | 0.5 | 0.2 | 0 | 0 | 0 | 0 | 0 | 0 | 0 | 0 |

| DIRECTION | 0 | 30 | 60 | 90 | 120 | 150 | 180 | 210 | 240 | 300 | 330 |
|---|---|---|---|---|---|---|---|---|---|---|---|
| PROBABILITY VALUE | 0.2 | 0.5 | 0.2 | 0 | 0 | 0 | 0.2 | 0.5 | 0.2 | 0 | 0 |

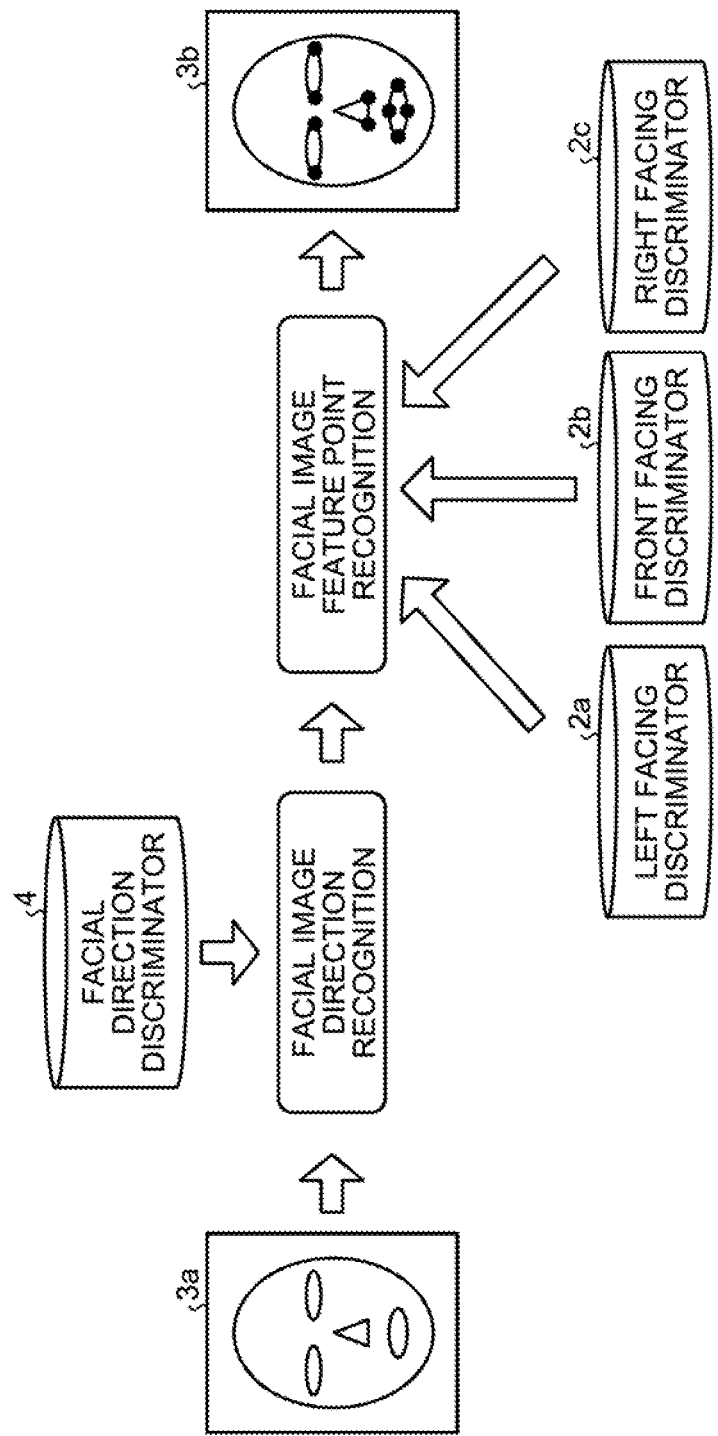

RECOGNITION DEVICE, RECOGNITION SYSTEM, RECOGNITION METHOD, AND NON-TRANSITORY COMPUTER READABLE RECORDING MEDIUM

CROSS-REFERENCE TO RELATED APPLICATION

This application is a continuation application of International Application PCT/JP2017/014721 filed on Apr. 10, 2017 and designates U.S., the entire contents of which are incorporated herein by reference.

FIELD

The present invention relates to a recognition device and the like.

[BACKGROUND ART] (BACKGROUND)

In recent years, there is a technique for recognition of a skeleton of a human body by: generation of a dictionary through machine learning based on distance data (distance images) resulting from sensing by use of a distance sensor or Red Green Blue (RGB) images; and use of the generated dictionary.

FIG. 29 is a diagram illustrating an example of a conventional skeleton recognition system. In the example illustrated in FIG. 29, distance data $5b$ including a target person $6a$ are acquired through sensing by use of a distance sensor $5a$, and skeletal positions $6b$ of the target person $6a$ are estimated by use of the distance data $5b$ and a dictionary $5c$. The dictionary $5c$ is acquired beforehand by machine learning.

Since recognition of a skeleton of a human body is premised on learning of various actions to be recognized in learning, when actions that are complex and are of a broad range like gymnastics are tried to be recognized by use of a single dictionary, for example, the recognition accuracy is reduced.

A first conventional technique is an example of a technique for prevention of reduction in recognition accuracy. The first conventional technique is a technique related to recognition of facial feature points. Facial feature points are points representing positions of the eyes, nose, mouth, and the like. In the first conventional technique, learning data are divided according to a front direction, a right direction, a left direction, and the like, and learning of facial feature points is performed with each of divided sets of the learning data. Hereinafter, an example of the first conventional technique will be described by use of FIG. 30 and FIG. 31.

FIG. 30 is a diagram illustrating a learning example for facial feature points according to the first conventional technique. In the learning of feature points according to the first conventional technique, machine learning is performed independently for each direction by use of training data representing: images classified beforehand according to directions of a face; and facial feature points in these images. The feature points are thereby recognized by limitation of the direction of the facial image input.

In the example illustrated in FIG. 30, a left facing discriminator $2a$ is acquired by learning of feature points of left facing facial images through use of training data $1a$ including left facing learning images and facial feature points. A front facing discriminator $2b$ is acquired by learning of feature points of front facing facial images through use of training data $1b$ including front facing learning images and facial feature points. A right facing discriminator $2c$ is acquired by learning of feature points of right facing facial images through use of training data $1c$ on right facing learning images and facial feature points.

FIG. 31 is a diagram illustrating a feature point recognition process according to the first conventional technique. As illustrated in FIG. 31, according to the first conventional technique, when a facial image $3a$ is received, a direction of the facial image $3a$ is recognized based on a facial direction discriminator $4$. According to the first conventional technique, a recognition result $3b$ is acquired by: selection of one discriminator from discriminators $2a$ to $2c$, based on a result of the recognition of the direction; and recognition of feature points of the facial image $3a$ by use of the selected discriminator. According to the first conventional technique, use of the different discriminators $2a$ to $2c$ depending on the directions of facial images as described above increases the recognition accuracy for the feature points.

Patent Literature 1: Japanese Laid-open Patent Publication No. 2012-000165
Patent Literature 2: Japanese Laid-open Patent Publication No. 2014-136137

However, the above described conventional technique has a problem that the recognition accuracy for skeletons of human bodies is low.

For example, according to the first conventional technique, the direction of the facial image $3a$ is recognized by use of the facial direction discriminator $4$, but for a target that moves in a complex manner as described above with respect to the first conventional technique, the scene is difficult to be identified in the same way as facial images. When a scene is unable to be identified accurately, an optimum dictionary is unable to be used, and as a result, the recognition accuracy is reduced.

The embodiments have been made in view of the above, and provide a device that enables improvement in recognition accuracy for skeletons of human bodies.

SUMMARY

According to an aspect of the embodiment of the invention, a recognition device, includes: a memory that stores therein: a first discriminator associating each of features of a person included in image information, with a first range indicating a range of direction that a body of the person has possibility of facing; a second discriminator associating each of features of the person included in distance information, with a second range indicating a range of direction that the body of the person has possibility of facing; and a joint position dictionary associating directions that the body of the person faces, with joint positions of the person; and a processor coupled to the memory and configured to: acquire image information of a target person, determine a first range corresponding to the image information of the target person, based on the first discriminator and a feature in the image information, acquire distance information of the target person, determine a second range corresponding to the distance information of the target person, based on the second discriminator and a feature in the distance information, determine a direction that a body of the target person is facing, based on the first range and the second range, and recognize a skeleton of the target person, based on the determined direction and the joint position dictionary.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram illustrating an example of a data structure of a direction probability holding table.

FIG. 8 is a diagram illustrating an example of a data structure of a human direction queue.

FIG. 13 is a diagram illustrating an example of human directions that are easily mistaken.

FIG. 31 is a diagram illustrating a feature point recognition process according to the first conventional technique.

DESCRIPTION OF EMBODIMENTS

However, the above described conventional technique has a problem that the recognition accuracy for skeletons of human bodies is low.

For example, according to the first conventional technique, the direction of the facial image 3a is recognized by use of the facial direction discriminator 4, but for a target that moves in a complex manner as described above with respect to the first conventional technique, the scene is difficult to be identified in the same way as facial images. When a scene is unable to be identified accurately, an optimum dictionary is unable to be used, and as a result, the recognition accuracy is reduced.

The embodiments have been made in view of the above, and provide a device that enables improvement in recognition accuracy for skeletons of human bodies.

Described hereinafter in detail based on the drawings are embodiments of a recognition device, a recognition system, a recognition method, and a recognition program, according to the present invention. The present invention is not limited by these embodiments.

First Embodiment

Figure 1:
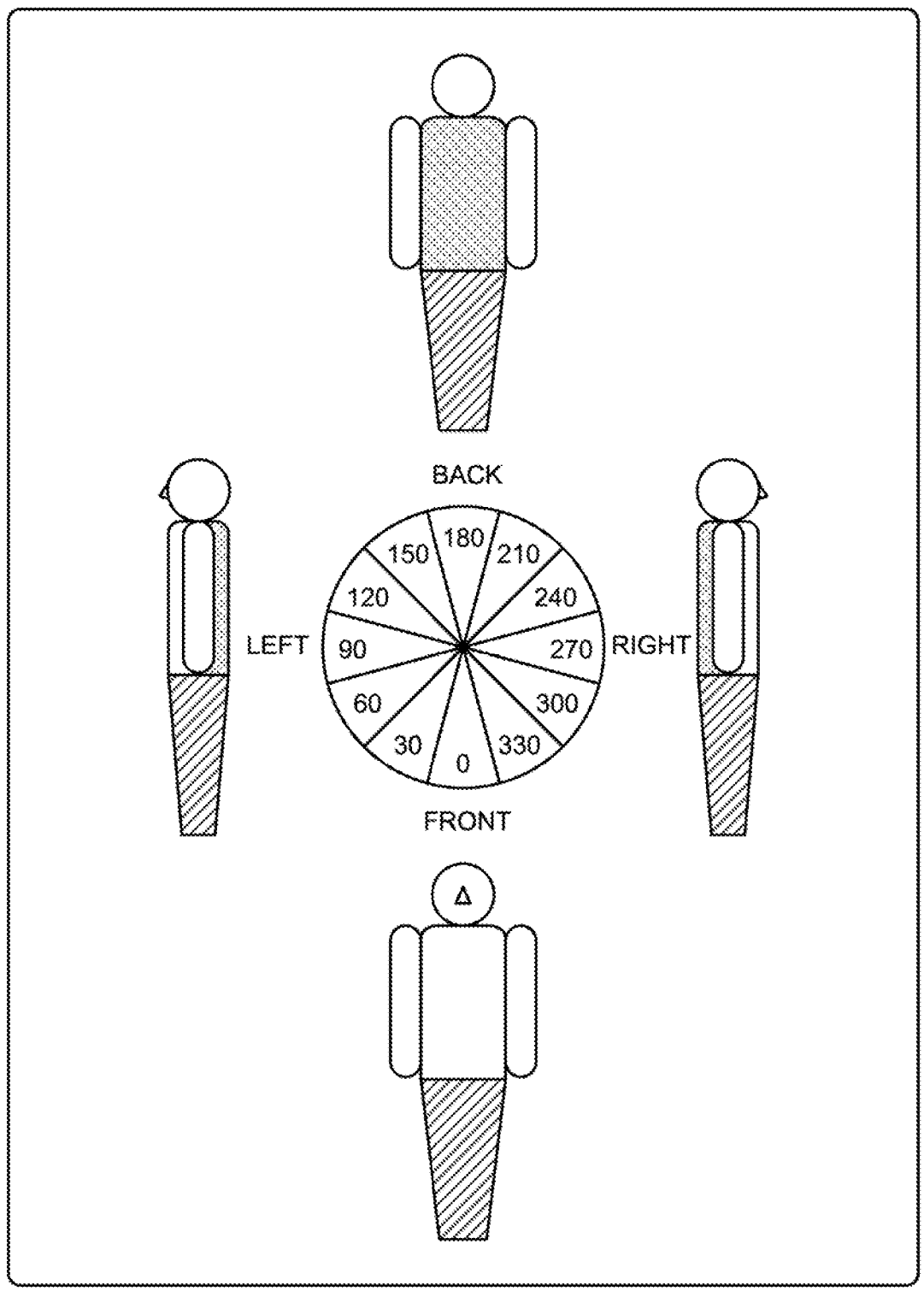
FIG. 1 is a diagram illustrating an example of definitions of directions of a person targeted according to a first embodiment.

FIG. 1 is a diagram illustrating an example of definitions of directions of a person targeted according to a first embodiment. As illustrated in FIG. 1, with a straight line being an axis, the straight line being vertical to a ground surface, a state where the person is facing the front is defined as 0°. A state where the person is facing to the left is defined as 90°. A state where the person is facing the back is defined as 180°. A state where the person is facing to the right is defined as 270°. According to the first embodiment, skeleton recognition is performed by recognition of a direction per unit resulting from division into four by 90°. For example, a range of 315° to 45° is defined as the front, a range of 45° to 135° is defined as the left, a range of 135° to 225° is defined as the back, and a range of 225° to 315° is defined as the right.

Figure 2:
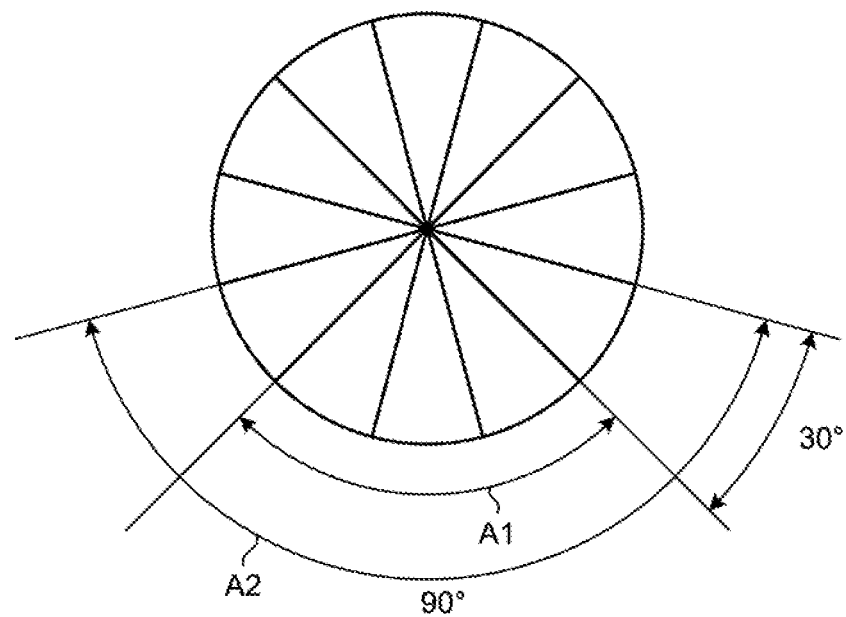
FIG. 2 is a first diagram illustrating an example of a recognition unit, a recognition range, and a learning range, for the directions treated according to the first embodiment.
Figure 3:
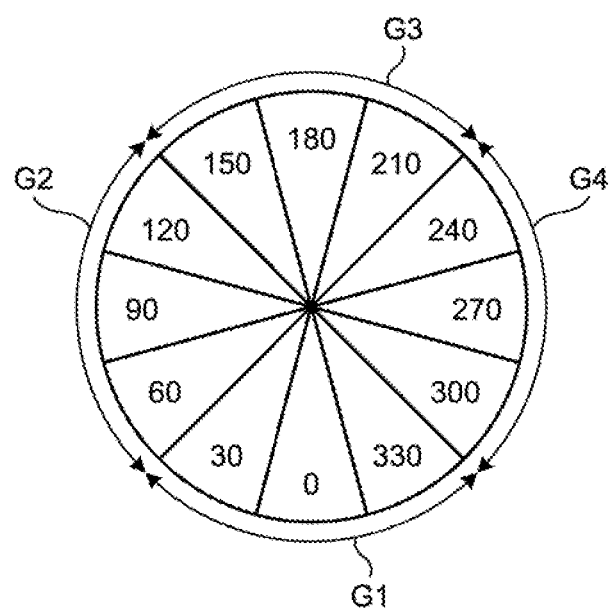
FIG. 3 is a second diagram illustrating the example of the recognition unit, the recognition range, and the learning range, for the directions treated according to the first embodiment.

FIG. 2 and FIG. 3 are diagrams illustrating an example of a recognition unit, a recognition range, and a learning range, for the directions treated according to the first embodiment. For example, a recognition device performs recognition in a narrow range for recognition of a human direction, and uses results of learning according to a wide range resulting from combination of plural recognition units for estimation of joint positions. FIG. 3 illustrates an example of recognition units for direction recognition. The recognition device performs learning and recognition in 30° units when direction recognition is performed, results of the learning and recognition are collected in 90° units, and decision into one of a front group G1, a left group G2, a back group G3, and a right group G4 is finally made.

As illustrated in FIG. 2, the recognition device decides directions in units of recognition ranges A1. For example, the units of the recognition ranges A1 correspond to units (90° units) of the groups G1 to G4 described above with respect to FIG. 3. Furthermore, when the actual direction of a person in recognition is near a boundary of the four divisions, the recognition device performs learning by use of data of a learning range A2 for prevention of reduction in accuracy of skeleton recognition. For example, the learning range A2 is a range of 150° that is wider to the right by 30° and to the left by 30°, than the recognition range A1.

Figure 4:
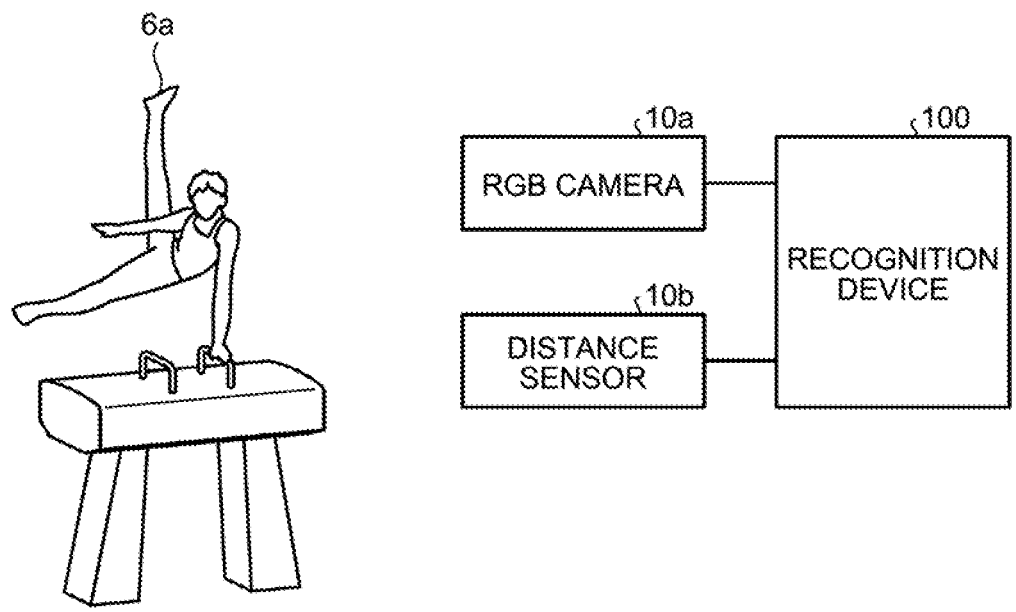
FIG. 4 is a diagram illustrating an example of a recognition system according to the first embodiment.

FIG. 4 is a diagram illustrating an example of a recognition system according to the first embodiment. As illustrated in FIG. 4, this recognition system has a Red Green Blue (RGB) camera 10a, a distance sensor 10b, and a recognition device 100. The recognition device 100 is connected to the RGB camera 10a and the distance sensor 10b.

The RGB camera 10a is a camera that captures an image (an RGB image) included in a captured range. The RGB camera 10a outputs information on the captured image, to the recognition device 100. In the description below, the information on the image captured by the RGB camera 10a will be referred to as "RGB image data".

The distance sensor 10b is a sensor that measures a distance from an installation position of the distance sensor 10b, to each measurement point on a target person 6a included in a captured range of the distance sensor 10b. The distance sensor 10b generates distance data (a distance image) indicating three dimensional coordinates of each measurement point, and outputs the generated distance data, to the recognition device 100.

Figure 5:
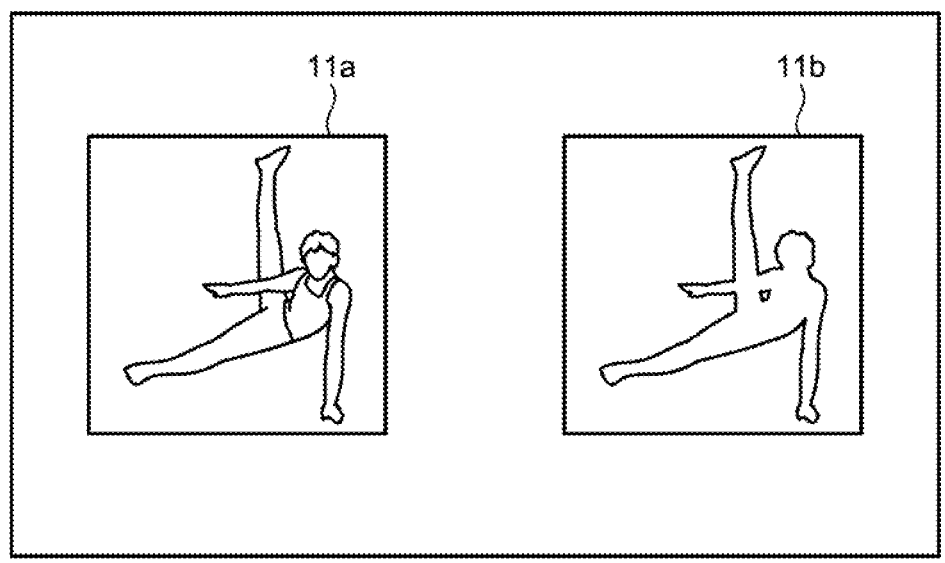
FIG. 5 is a diagram illustrating an example of RGB image data and distance data.

FIG. 5 is a diagram illustrating an example of the RGB image data and the distance data. For example, RGB image data 11a have therein coordinates associated with pixel values (RGB values). Distance data 11b have therein coordinates associated with distances from three dimensional coordinates or the distance sensor 10b, to points corresponding to the coordinates.

The recognition device 100 is a device that: determines a more probable human direction by using a result of recognition of a human direction based on the RGB image data 11a and a result of recognition of a human direction based on the distance data 11b; and performs skeleton recognition for the target person 6a by using a dictionary corresponding to the determined human direction.

Figure 6:
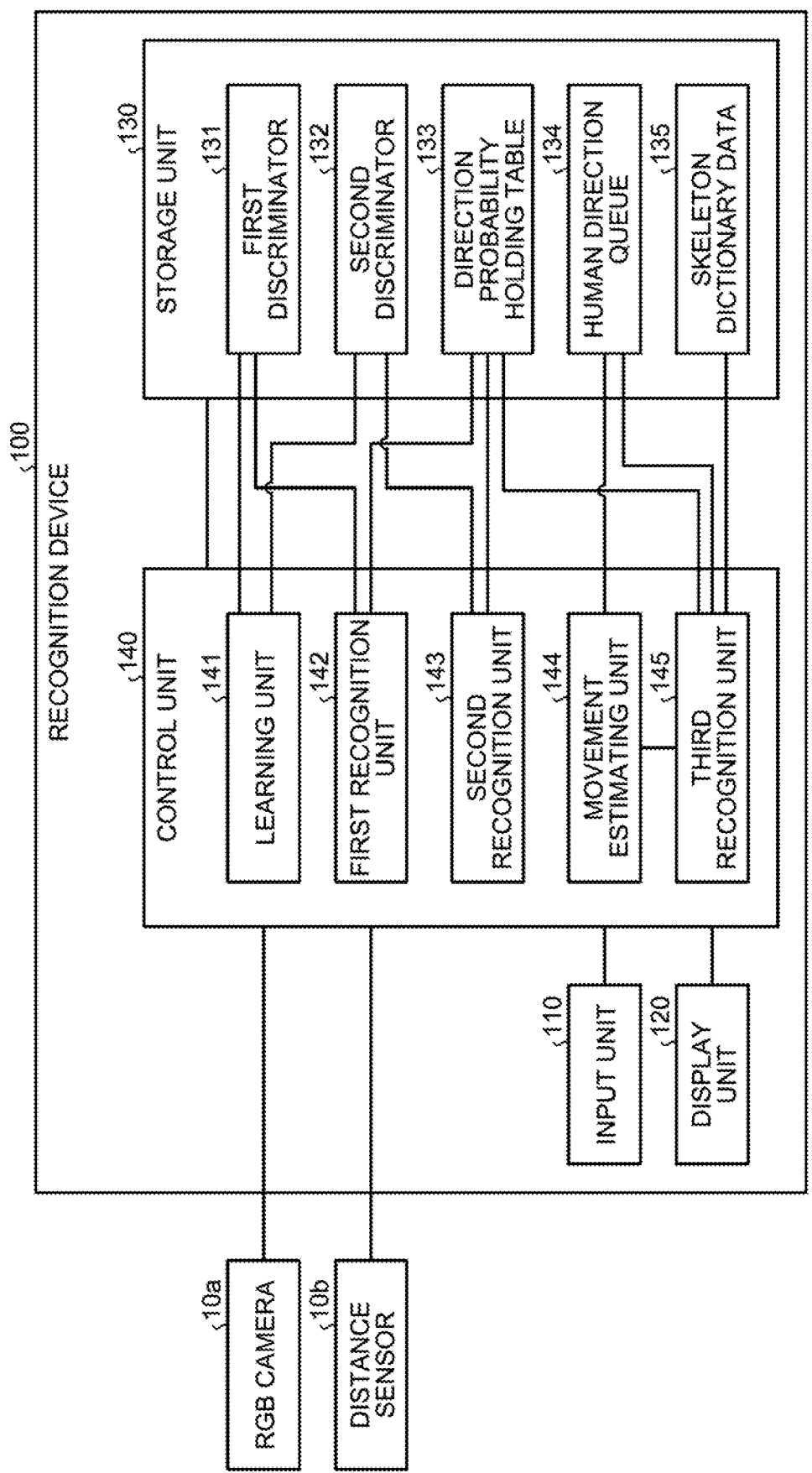
FIG. 6 is a functional block diagram illustrating a configuration of a recognition device according to the first embodiment.

FIG. 6 is a functional block diagram illustrating a configuration of the recognition device according to the first embodiment. As illustrated in FIG. 6, the recognition device 100 has an input unit 110, a display unit 120, a storage unit 130, and a control unit 140. Furthermore, the recognition device 100 is connected to the RGB camera 10a and the distance sensor 10b.

The input unit 110 is an input device for input of various types of information, to the recognition device 100. For example, the input unit 110 corresponds to a keyboard and a mouse, a touch panel, or the like.

The display unit 120 is a display device that displays information output from the control unit 140. For example, the display unit 120 corresponds to a liquid display, a touch panel, or the like.

The storage unit 130 has a first discriminator 131, a second discriminator 132, a direction probability holding table 133, a human direction queue 134, and skeleton dictionary data 135. The storage unit 130 corresponds to: a semiconductor memory device, such as a random access memory (RAM), a read only memory (ROM), or a flash memory; or a storage device, such as a hard disk drive (HDD).

The first discriminator 131 is information on a discriminator that identifies a direction of the body of the target person 6a, based on the RGB image data 11a. In the following description, the direction of the body of a person (the target person 6a) will be referred to as the "human direction". For example, the first discriminator 131 associates feature values of a person in RGB image data that are learnt beforehand, with human directions.

The second discriminator 132 is information on a discriminator that identifies a human direction of the target person 6a, based on the distance data 1b. For example, the second discriminator 132 associates feature values of a person in distance data that are learnt beforehand, with human directions.

The direction probability holding table 133 is a table associating each direction resulting from division into recognition units related to a target person, with a probability value. FIG. 7 is a diagram illustrating an example of a data structure of the direction probability holding table. As illustrated in FIG. 7, the direction probability holding table 133 includes a first probability holding table 133a and a second probability holding table 133b.

The first probability holding table 133a is a table that stores therein results of recognition by a first recognition unit 142 described later. The second probability holding table 133b is a table that stores therein results of recognition by a second recognition unit 143 described later. The first probability holding table 133a and second probability holding table 133b associate directions with probability values. For example, the directions have been divided in 30° units serving as the recognition units described with respect to FIG. 2. A probability value is a value indicating probability that the human direction is that particular direction, and the higher the probability value is, the more probable that the human direction is that particular direction.

The human direction queue 134 is a queue having, held therein, a history of human directions determined in the past by a third recognition unit 145 described later. FIG. 8 is a diagram illustrating an example of a data structure of the human direction queue. As illustrated in FIG. 8, this human direction queue 134 has human directions recorded therein in order. For example, every time the third recognition unit 145 determines a human direction, the third recognition unit 145 stores the human direction in the human direction queue 134 from the top in order.

The skeleton dictionary data 135 are information associating human directions with the person's joint positions corresponding to the human directions. For example, what has been acquired by joining of joint positions of a person corresponds to a skeleton of the person.

FIG. 6 will now be referred to again. The control unit 140 has a learning unit 141, the first recognition unit 142, the second recognition unit 143, a movement estimating unit 144, and the third recognition unit 145. The control unit 140 may be realized by a central processing unit (CPU), a micro processing unit (MPU), or the like. Furthermore, the control unit 140 may also be realized by hard wired logic, such as an application specific integrated circuit (ASIC) or a field programmable gate array (FPGA).

For example, the learning unit 141 operates in a learning phase. The first recognition unit 142, the second recognition unit 143, the movement estimating unit 144, and the third recognition unit 145 operate in a recognition phase.

Figure 9:
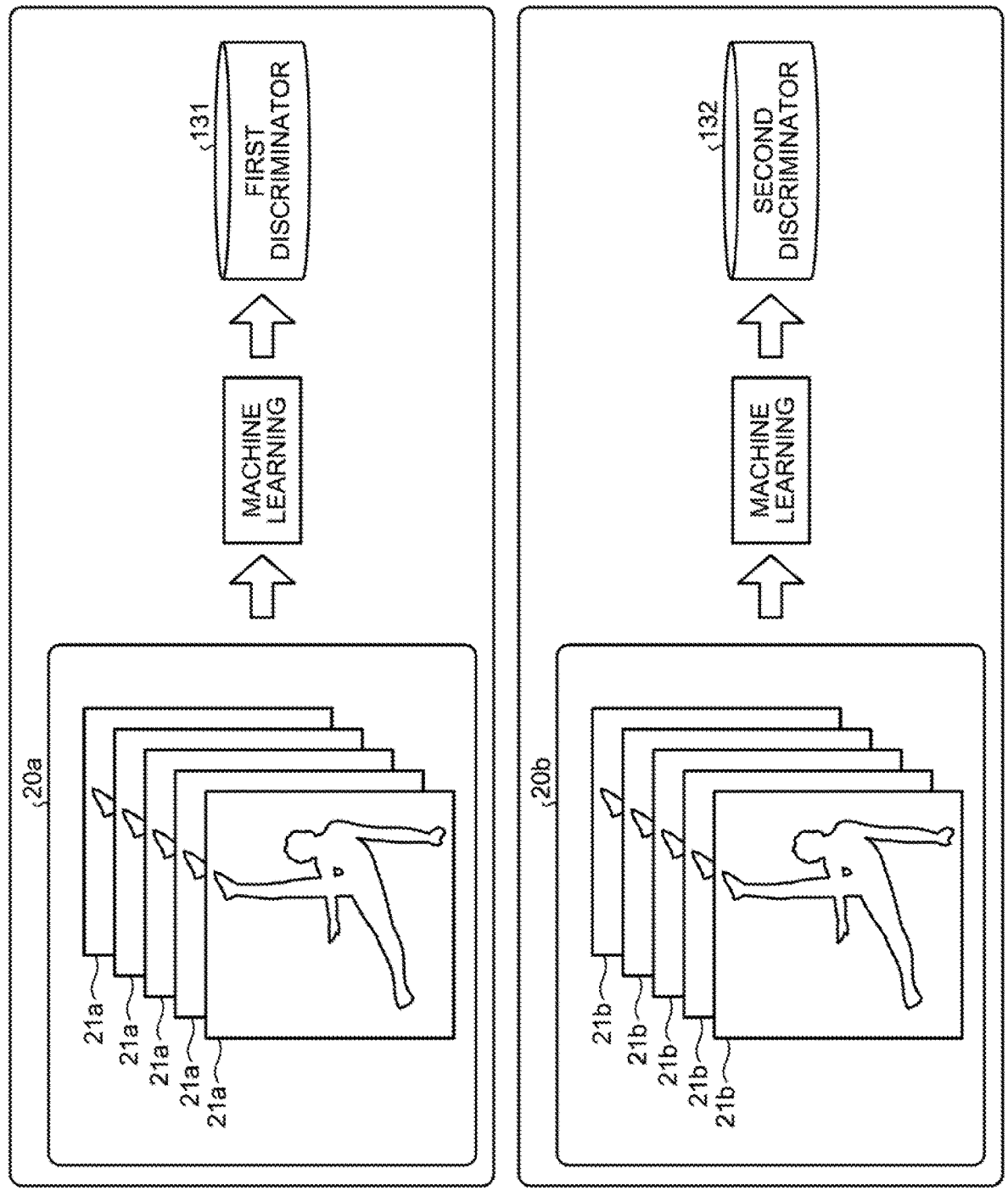
FIG. 9 is a diagram for explanation of an example of processing by a learning unit.

The learning unit 141 is a processing unit that generates the first discriminator 131 and the second discriminator 132, in the learning phase. FIG. 9 is a diagram for explanation of an example of processing by the learning unit. Described first below is an example of a process where the learning unit 141 generates the first discriminator 131. The learning unit 141 acquires learning image data 20a. The learning image data 20a include plural sets of RGB image data 21a. Each set of RGB image data 21a has a training label assigned thereto. A training label is information uniquely identifying a human direction of a person included in a set of RGB image data 21a, and is any one of "front", "left", "back", and "right". The training label may be information directly indicating a human direction range as illustrated in FIG. 3, or may be an angle value itself indicating a direction of the person included in the set of RGB image data 21a.

The learning unit 141 performs machine learning based on plural sets of RGB image data 21a assigned with the training label, "front", and extracts feature values for the human direction, "front". The learning unit 141 registers the human direction, "front", in association with the feature values of the human direction, "front", into the first discriminator 131. The learning unit 141 performs machine learning similarly for plural sets of RGB image data 21a assigned with each of the other training labels, "left", "back", and "right". The learning unit 141 registers the feature values of each of the human directions, "left", "back", and "right", in association with the human direction, "left", "back", or "right", into the first discriminator 131.

Described now is an example of a process where the learning unit 141 generates the second discriminator 132. The learning unit 141 acquires learning distance data 20b. The learning distance data 20b include plural sets of distance data 21b. Each set of distance data 21b has a training label assigned thereto. A training label is information uniquely identifying a direction of a person included in a set of distance data 21b, and is any one of "front", "left", "back", and "right". The training label may be information directly indicating a human direction range as illustrated in FIG. 3, or may be an angle value itself indicating a direction of the person included in the set of distance data 21b.

The learning unit 141 performs machine learning based on the plural sets of distance data 21b assigned with the training label, "front", and extracts feature values of the human direction, "front". The learning unit 141 registers the human direction, "front", in association with the feature values of the human direction, "front", into the second discriminator 132. The learning unit 141 performs machine learning similarly for plural sets of RGB image data 21a assigned with each of the other training labels, "left", "back", and "right". The learning unit 141 registers the feature values of each of the human directions, "left", "back", and "right", in association with the human direction, "left", "back", or "right", into the second discriminator 132.

In the above description, the case where the learning unit 141 generates the first discriminator 131 and the second discriminator 132 in the learning phase has been described, but limitation is not made to this case. For example, the recognition device 100 may store the first discriminator 131 and second discriminator 132 in the storage unit 130 beforehand. Furthermore, the learning unit 141 may generate the first discriminator 131 and second discriminator 132 by finding feature values of each human direction through use of deep learning or the like.

The first recognition unit 142 is a processing unit that acquires the RGB image data 11a from the RGB camera 10a, and recognizes, based on the first discriminator 131, a human direction of the target person 6a, in the recognition phase. In the following description, a process where the first recognition unit 142 recognizes a human direction will be referred to as a "first recognition process". The first recognition unit 142 stores the recognition result of the first recognition process into the first probability holding table 133a. The recognition result of the first recognition process will be referred to as the "first recognition result".

Described next is an example of the first recognition process. The first recognition unit 142 compares the feature values of the RGB image data 11a, with the feature values for "front", "left", "back", and "right" that are included in the first discriminator 131, and based on similarity therebetween or the like, determines a probability value for each human direction. The probability values for the respective human directions serve as the first recognition result. Probability values are similarly determined for a case where learning is performed by use of information directly indicating human direction ranges; and in a case where learning is performed with angle values indicating human directions, by assuming that a probability of a human direction including an angle in a recognition result is 1, a probability value is determined. Furthermore, plural discriminators may be generated beforehand by use of plural different learning data sets, and a probability value for each human direction may be determined by majority decision for results of recognition by use of these discriminators.

Figure 10:
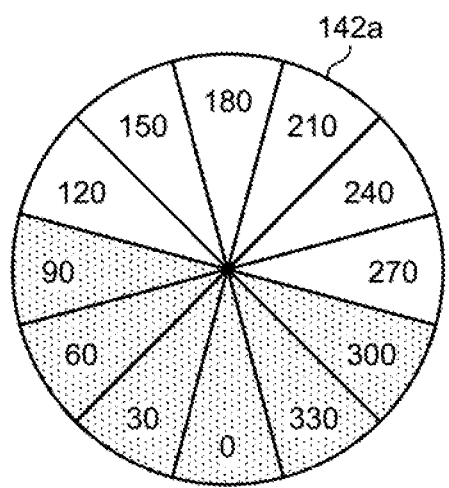
FIG. 10 is a diagram illustrating an example of a first recognition result.

FIG. 10 is a diagram illustrating an example of the first recognition result. In this example, the magnitude of the probability values in the first recognition result 142a is represented by density of a color, and the denser the color is, the larger the probability value is indicated to be. The example illustrated in FIG. 10 indicates that the human direction has the possibility of being included in a range of 90° to 300°. For example, the first probability holding table 133a in FIG. 7 represents the first recognition result 142a with numerical values.

Figure 11:
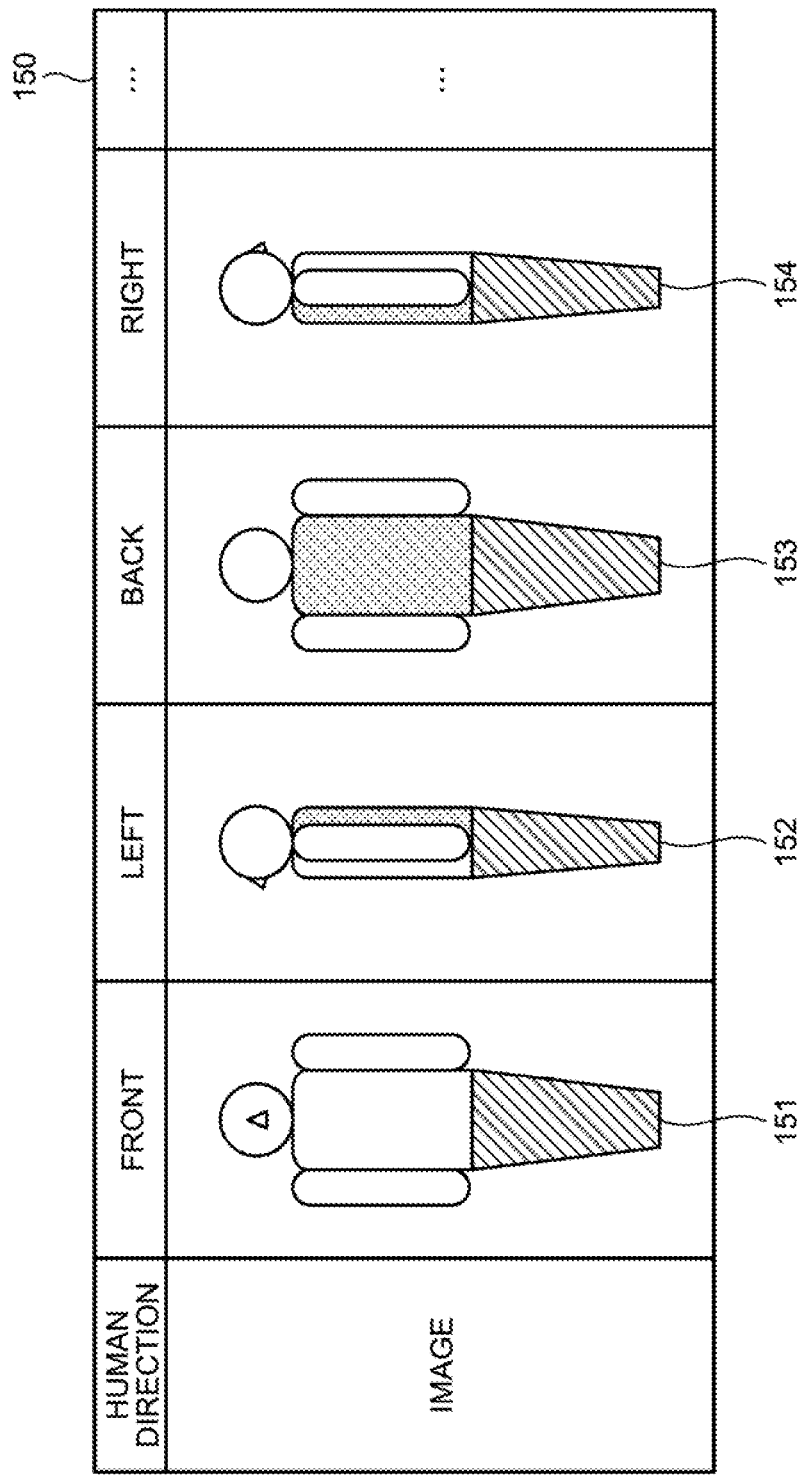
FIG. 11 is a diagram illustrating an example of a rule base.

The case where the first recognition unit 142 executes the first recognition process by comparing the RGB image data 11a with the first discriminator 131 has been described as an example, but a human direction may be determined based on a rule base using color information. FIG. 11 is a diagram illustrating an example of the rule base. As illustrated in FIG. 11, a rule base 150 discriminates between human directions of the target person 6a according to positional relations among colors of: the front and back of the uniform; and the lower half of the body.

For example, when the positional relations among the colors of the front and back of the uniform and the color of the lower half of the body correspond to an image 151, the human direction is determined to be "front". When the positional relations among the colors of the front and back of the uniform and the color of the lower half of the body correspond to an image 152, the human direction is determined to be "left". When the positional relations among the colors of the front and back of the uniform and the color of the lower half of the body correspond to an image 153, the human direction is determined to be "back". When the positional relations among the colors of the front and back of the uniform and the color of the lower half of the body correspond to an image 154, the human direction is determined to be "right". The rule base 150 may have another variety of images, other than the images 151 to 154, and the other variety of images may be associated with human directions.

The second recognition unit 143 is a processing unit that acquires the distance data 11b from the distance sensor 10b, and recognizes, based on the second discriminator 132, a human direction of the target person 6a, in the recognition phase. In the following description, a process where the second recognition unit 143 recognizes a human direction will be referred to as a "second recognition process". The second recognition unit 143 stores the recognition result of the second recognition process into the second probability holding table 133b. The recognition result of the second recognition process will be referred to as the "second recognition result".

Described now is an example of the second recognition process. The second recognition unit 143 compares the feature values of the distance data 11b, with the feature values for "front", "left", "back", and "right" that are included in the second discriminator 132, and based on similarity therebetween or the like, determines a probability value for each human direction. Probability values are similarly determined for a case where learning is performed by use of information directly indicating human direction ranges; and in a case where learning is performed with angle values indicating human directions, by assuming that a probability of a human direction including an angle in a recognition result is 1, a probability value is determined. Furthermore, plural discriminators may be generated beforehand by use of plural different learning data sets, and a probability value for each human direction may be determined by majority decision for results of recognition by use of these discriminators. The probability values for the respective human directions serve as the second recognition result. The recognition of a human direction by use of the distance data 11b enables recognition of the human direction accurately to some extent, as compared to the above described first recognition process.

Figure 12:
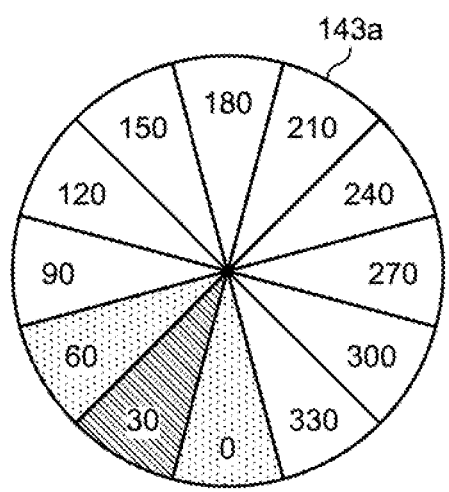
FIG. 12 is a diagram illustrating an example of a second recognition result.

FIG. 12 is a diagram illustrating an example of the second recognition result. In this example, the magnitude of the probability values in the second recognition result 143a is represented by density of a color, and the denser the color is, the larger the probability value is indicated to be. The example illustrated in FIG. 12 indicates that the human direction has the possibility of being included in a range of 0° to 60°. For example, the second probability holding table 133b in FIG. 7 represents the second recognition result 143a with numerical values.

As to shapes of a person, since his/her three dimensional shapes in a diagonal direction are similar, recognition of a human direction may be mistaken. FIG. 13 is a diagram illustrating examples of human directions that are easy to be mistaken. As illustrated in FIG. 13, in the front (0°) and back (180°) pair, and the right (270°) and left (90°) pair, the three dimensional shapes are similar, and thus the second recognition result of the second recognition process may be wrong.

Figures 14, 15:
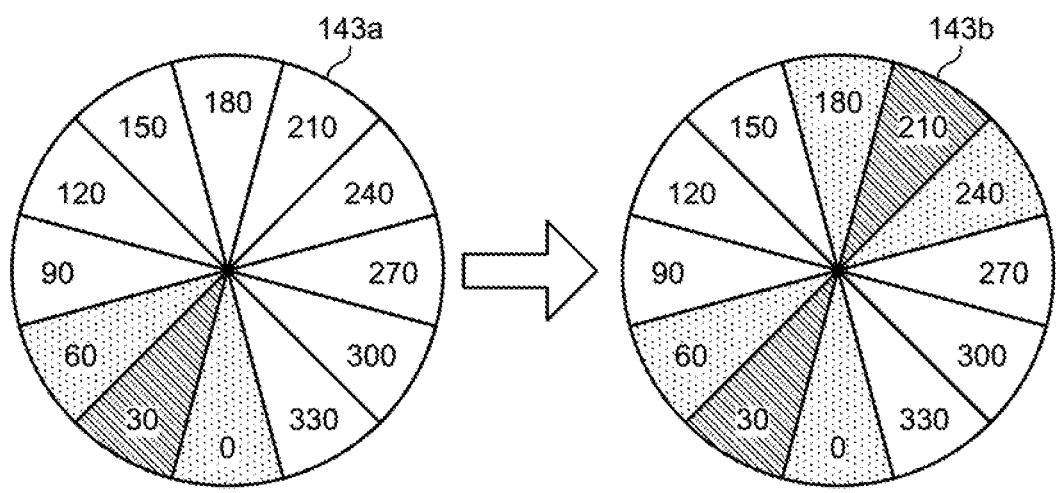
FIG. 14 is a first diagram for explanation of a diagonal direction adding process.
FIG. 15 is a second diagram for explanation of the example of the diagonal direction adding process.

Therefore, after executing the second recognition process, the second recognition unit 143 executes a diagonal direction adding process. FIG. 14 and FIG. 15 are diagrams for explanation of an example of the diagonal direction adding process. By setting the same probability value for a range on a diagonal line from the second recognition result 143a, the second recognition unit 143 generates a second recognition result 143b. As illustrated in FIG. 14, the second recognition unit 143 respectively sets probability values for directions, "60°", "30°", and "0°", in the second recognition result 143a as probability values for directions, "240°", "210°", and "180°".

That is, the second recognition unit 143 accesses the direction probability holding table 133, and updates the second probability holding table 133b. For example, as illustrated in FIG. 15, the second recognition unit 143 sets the probability values for the directions, "60°", "30°", and "0°", as the probability values for the directions, "240°", "210°", and "180°". The second probability holding table 133b is thereby updated to a second probability holding table 133b'.

FIG. 6 will now be referred to again. The movement estimating unit 144 is a processing unit that estimates, based on the human direction queue 134, a moving direction and a moving distance. The movement estimating unit 144 outputs a result of the estimation, to the third recognition unit 145.

Described now is an example of a process where the movement estimating unit 144 estimates a "moving direction". A moving direction estimated is either right rotation or left rotation. The movement estimating unit 144 refers to the human direction queue 134, and reads directions corresponding to two consecutive frames. For example, an older direction of the read directions corresponding to the two frames is referred to as a first direction, and a newer direction thereof as a second direction. If the rotation direction from the first direction to the second direction is rightward, the movement estimating unit 144 estimates the moving direction as "right rotation". If the rotation direction from the first direction to the second direction is leftward, the movement estimating unit 144 estimates the moving direction as "left rotation". The movement estimating unit 144 may repeatedly execute the above process, and estimate the moving direction by majority decision.

Described now is an example of a process where the movement estimating unit 144 estimates a "moving distance". A moving distance referred to herein is information indicating how much in angle the human direction has changed between the two consecutive frames. By reference to the human direction queue 134, the directions corresponding to the two consecutive frames are read. The movement estimating unit 144 estimates a difference between the directions of the two consecutive frames, as a moving distance. The movement estimating unit 144 may repeatedly execute the above described process, calculate an average value of the moving distances, and estimate the average value as a moving distance.

Based on the direction probability holding table 133 and a result of the estimation by the movement estimating unit 144, the third recognition unit 145 determines the most probable human direction of the target person 6a. Based on the determined human direction and the skeleton dictionary data 135, the third recognition unit 145 recognizes a skeleton of the target person 6a. For example, the third recognition unit 145 executes a filtering process, a human direction recognition process, and a skeleton recognition process in order.

Figure 16:
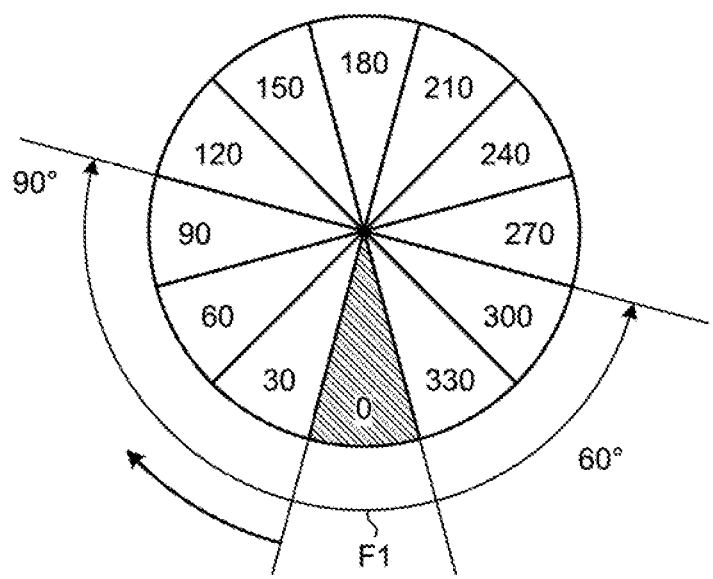
FIG. 16 is a first diagram for explanation of an example of a filtering process.
Figure 17:
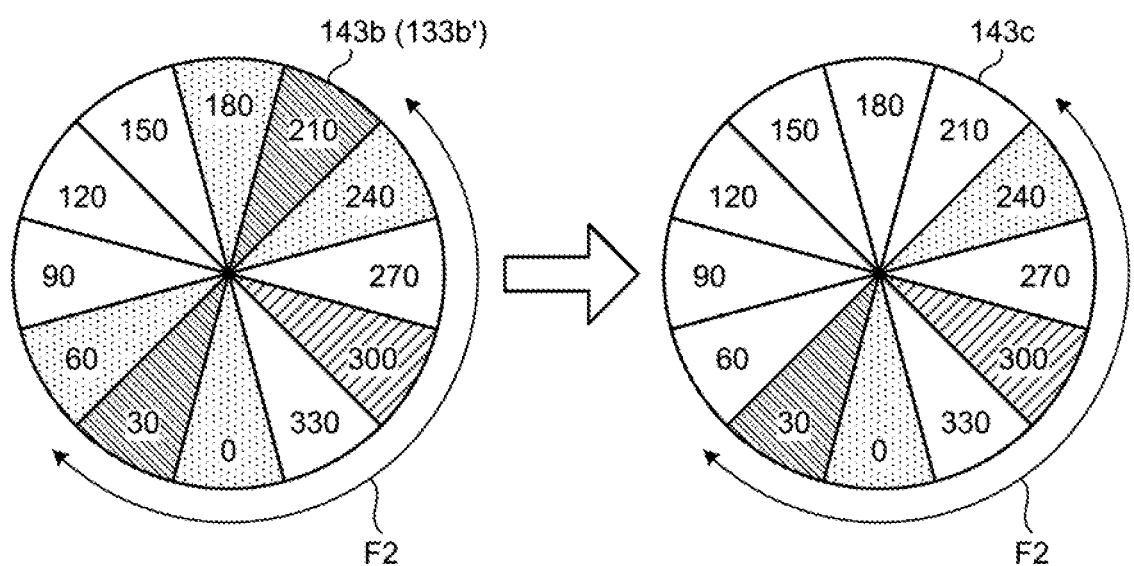
FIG. 17 is a second diagram for explanation of the example of the filtering process.

Described now is an example of the filtering process executed by the third recognition unit 145. FIG. 16 and FIG. 17 are diagrams for explanation of the example of the filtering process. Firstly, based on the direction, moving direction, and moving distance of a previous frame, the third recognition unit 145 sets a filtering range. The third recognition unit 145 sets, as the filtering range, "with the direction of the previous frame being the origin", a range corresponding to "a moving distance+30° in the moving direction" and "the moving distance in a direction opposite to the moving direction". The third recognition unit 145 acquires information on the direction of the previous frame from the human direction queue 134.

For example, if the direction of the previous frame is "0°", the moving direction is "right rotation", and the moving distance is "60°", the filtering range becomes a filtering range F1 illustrated in FIG. 16.

After determining the filtering range, the third recognition unit 145 compares the filtering range F1 with the second probability holding table 133b, and sets the probability values for directions not included in the filtering range F1 to "0". Description will now be made by use of FIG. 17. For example, if the direction of the previous frame is "300°", the moving direction is "right rotation", and the moving distance is "60°", the filtering range becomes F2. Therefore, by setting the probability values for "180°" and "210°", from the directions in the second recognition result 133b' (the second recognition result 143b), to "0", the third recognition unit 145 acquires a filtering recognition result 143c.

Figure 18:
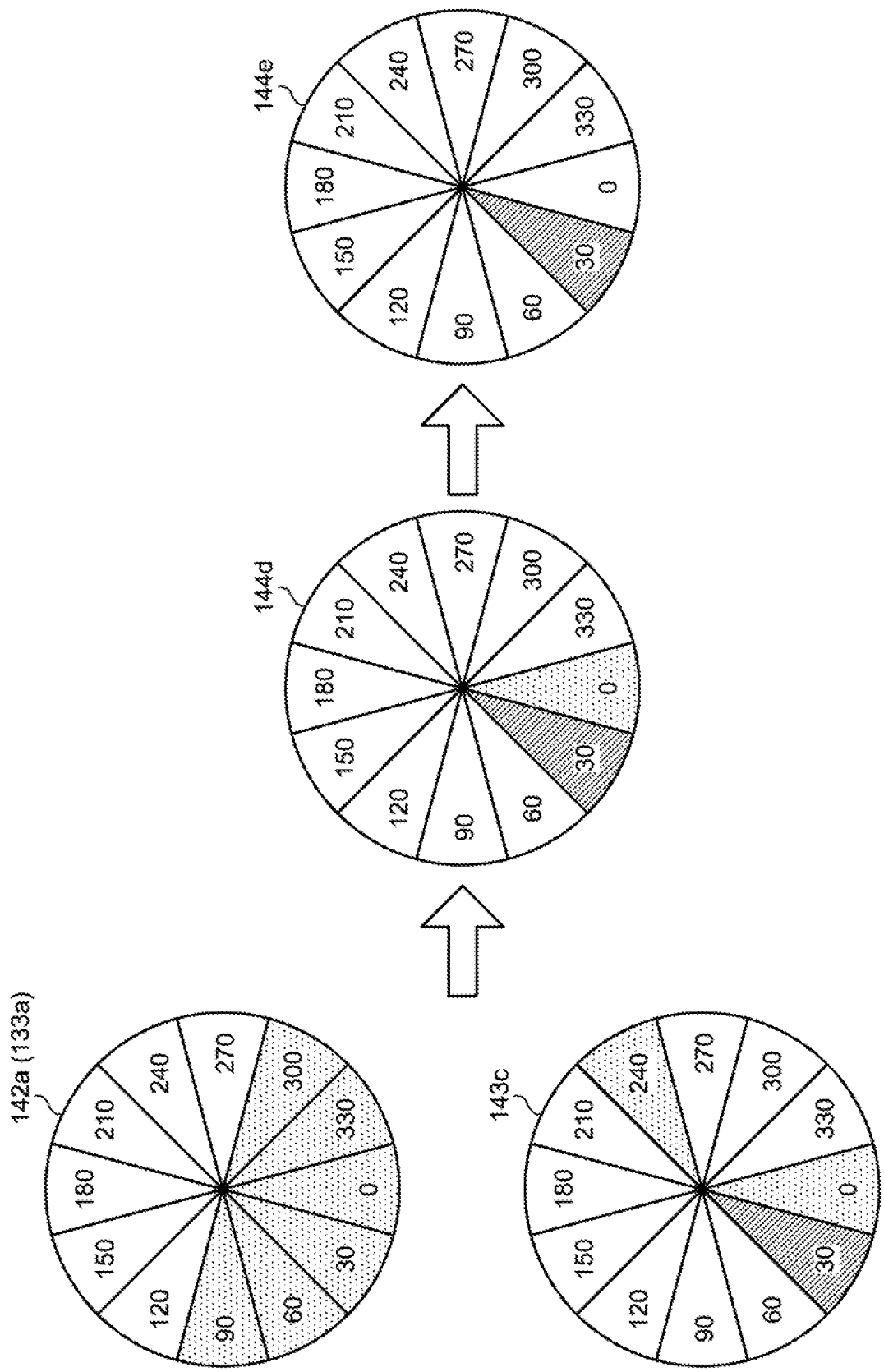
FIG. 18 is a diagram for explanation of an example of a human direction recognition process.

Described now is an example of the human direction recognition process executed by the third recognition unit 145. FIG. 18 is a diagram for explanation of the example of the human direction recognition process. The third recognition unit 145 compares the first recognition result 142a (the first probability holding table 133a) with the filtering recognition result 143c.

The third recognition unit 145 leaves a larger probability value for a direction having probability values in both of them. The third recognition unit 145 sets a probability value for a direction having no probability values in both of them to "0". By executing this process, the third recognition unit 145 generates an interim recognition result 144d. In the example illustrated in FIG. 18, the probability values for the directions 0° and 30° in the interim recognition result 144d become the probability values for the directions 0° and 30° in the filtering recognition result 143c, and the probability value for the other directions becomes 0.

The third recognition unit 145 refers to the probability value for each direction in the interim recognition result 144d, and determines the direction having the maximum probability value as the human direction of the target person 6a. For example, in the example represented by a determination result 144e in FIG. 18, the human direction is determined to be "30°".

Figure 19:
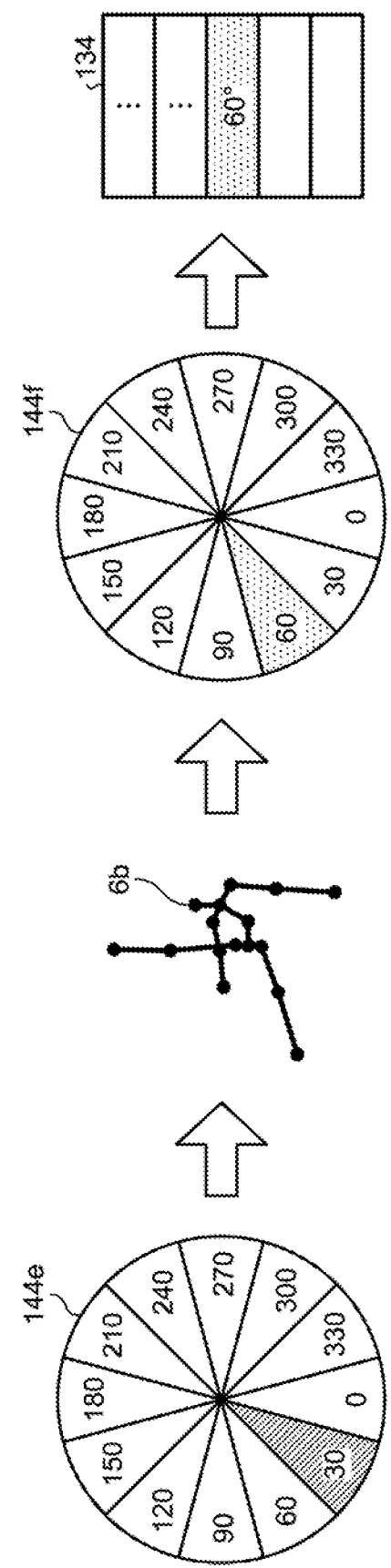
FIG. 19 is a diagram for explanation of an example of a skeleton recognition process.

Described now is an example of the skeleton recognition process executed by the third recognition unit 145. FIG. 19 is a diagram for explanation of the example of the skeleton recognition process. As illustrated in FIG. 19, the third recognition unit 145 acquires, from the skeleton dictionary data 135, information on joint positions corresponding to the human direction determined from the determination result 144e, and estimates skeletal positions 6b by performing joint position estimation for the target person 6a.

Based on the skeletal positions 6b, the third recognition unit 145 determines a more accurate human direction of the target person 6a. For example, the third recognition unit 145 acquires three dimensional coordinates of three points at both shoulders and the middle of the backbone that are included in the skeletal positions 6b, and calculates a normal vector determined by the three points. The third recognition unit 145 calculates a projection vector resulting from projection of the normal vector onto an XZ plane (a floor surface). The third recognition unit 145 calculates an angle between the projection vector and the front direction vector. The third recognition unit 145 compares the calculated angle with the recognition unit, and determines a final human direction. In the example represented by a final result 144f in FIG. 19, the human direction 60° is determined as the final human direction. The third recognition unit 145 registers information on the final human direction into the human direction queue 134.

In the recognition phase, every time the above described first recognition unit 142, second recognition unit 143, movement estimating unit 144, and third recognition unit 145 acquire RGB image data and distance data from the RGB camera 10a and distance sensor 10b, they repeatedly execute the above described process.

Figure 20:
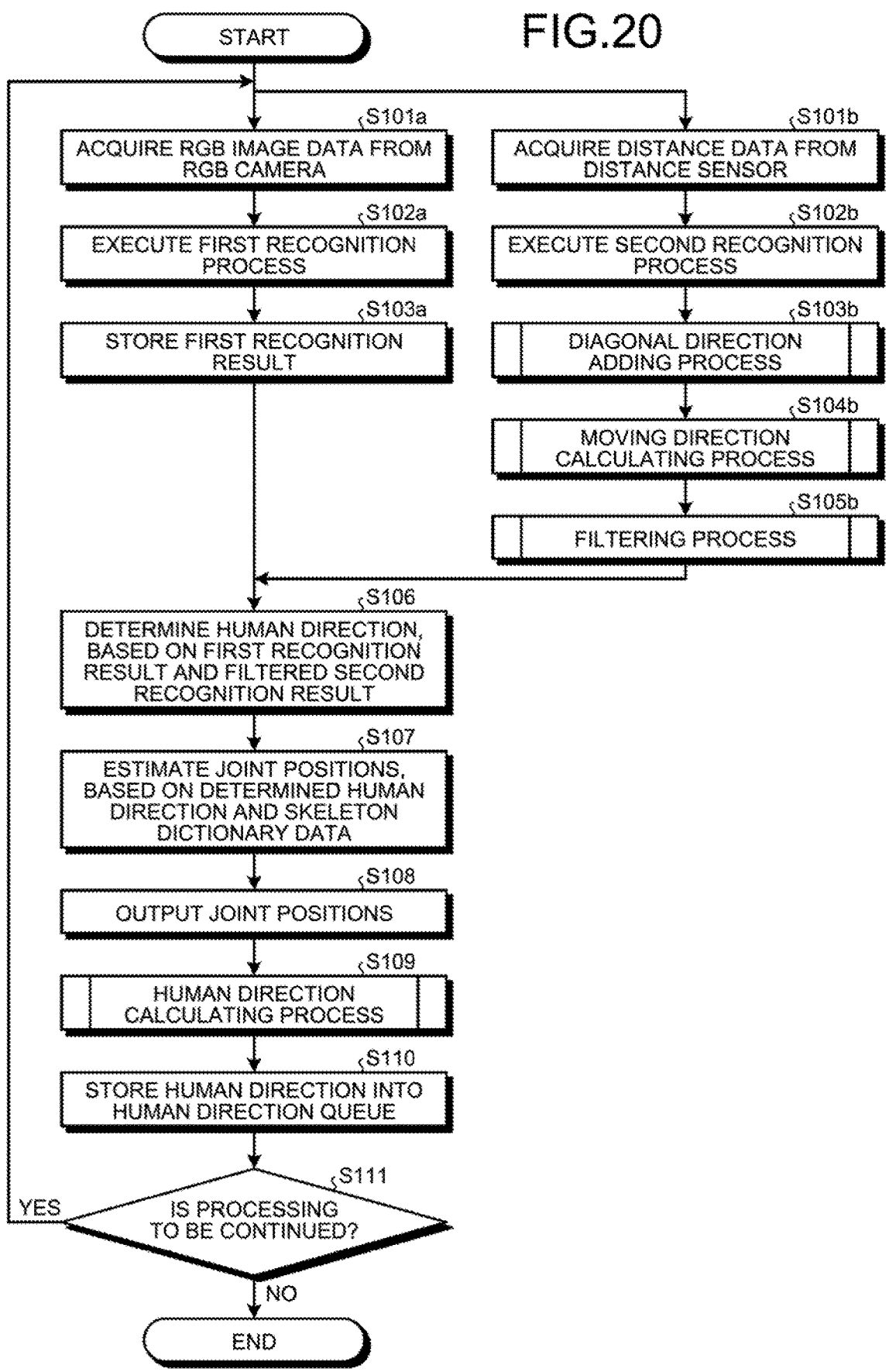
FIG. 20 is a flow chart illustrating processing procedures of the recognition device according to the first embodiment.

Described next is an example of processing procedures by the recognition device 100 according to the first embodiment. FIG. 20 is a flow chart illustrating the processing procedures by the recognition device according to the first embodiment. As illustrated in FIG. 20, the first recognition unit 142 of the recognition device 100 acquires the RGB image data 11a from the RGB camera 10a (Step S101a). The first recognition unit 142 executes the first recognition process (Step S102a). The first recognition unit 142 stores the first recognition result into the direction probability holding table 133 (Step S103a).

The second recognition unit 143 of the recognition device 100, on the other hand, acquires the distance data 11b, from the distance sensor 10b (Step S101b). The second recognition unit 143 executes the second recognition process (Step S102b). The second recognition unit 143 executes the diagonal direction adding process (Step S103b). The movement estimating unit 144 of the recognition device 100 executes a moving direction calculating process (Step S104b). The third recognition unit 145 of the recognition device 100 executes the filtering process (Step S105b).

Based on the first recognition result, and the second recognition result, which has been subjected to the filtering process, the third recognition unit 145 determines a human direction (Step S106). The third recognition unit 145 estimates joint positions, based on the determined human direction and the skeleton dictionary data (Step S107).

The third recognition unit 145 outputs the joint positions (Step S108), and executes a human direction calculating process (Step S109). The third recognition unit 145 stores the human direction into the human direction queue 134 (Step S110). If the process is to be continued (Step S111, Yes), the recognition device 100 proceeds to Steps S101a and S101b. If the process is not to be continued (Step S111, No) the recognition device 100 ends the process.

Figure 21:
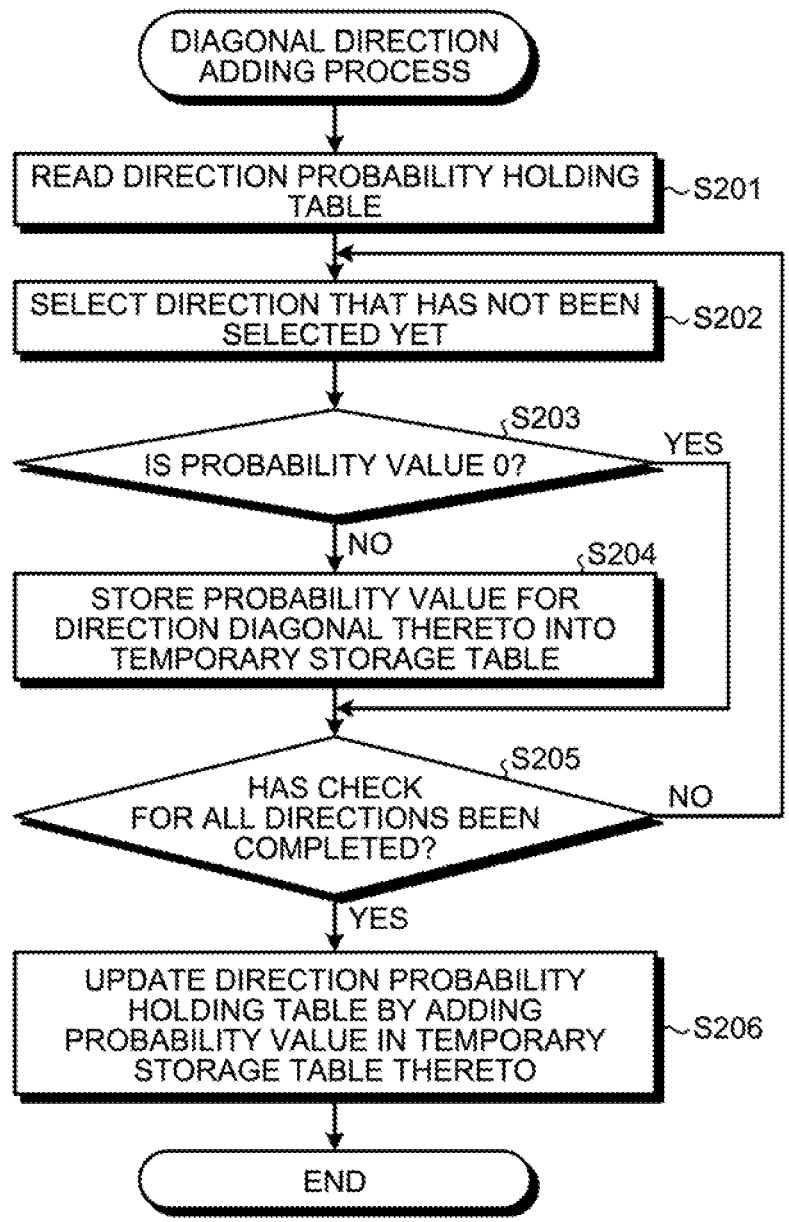
FIG. 21 is a flow chart illustrating processing procedures of the diagonal direction adding process.

Described now is an example of the diagonal direction adding process illustrated at Step S103b in FIG. 20. FIG. 21 is a flow chart illustrating processing procedures of the diagonal direction adding process. As illustrated in FIG. 21, the second recognition unit 143 of the recognition device 100 reads the direction probability holding table 133 (the second probability holding table 133b) (Step S201), and selects a direction that has not been selected yet (Step S202).

If the probability value of the selected direction is 0 (Step S203, Yes), the second recognition unit 143 proceeds to Step S205. On the contrary, if the probability value of the selected direction is not 0 (Step S203, No), the second recognition unit 143 stores the probability value for a direction diagonal thereto into a temporary storage table (Step S204).

If check for all of the directions has not been completed (Step S205, No), the second recognition unit 143 proceeds to Step S202. On the contrary, if the check for all of the directions has been completed, the second recognition unit 143 updates the direction probability holding table 133 by adding the probability values in the temporary storage table, into the direction probability holding table 133 (the second probability holding table 133b) (Step S206).

Figure 22:
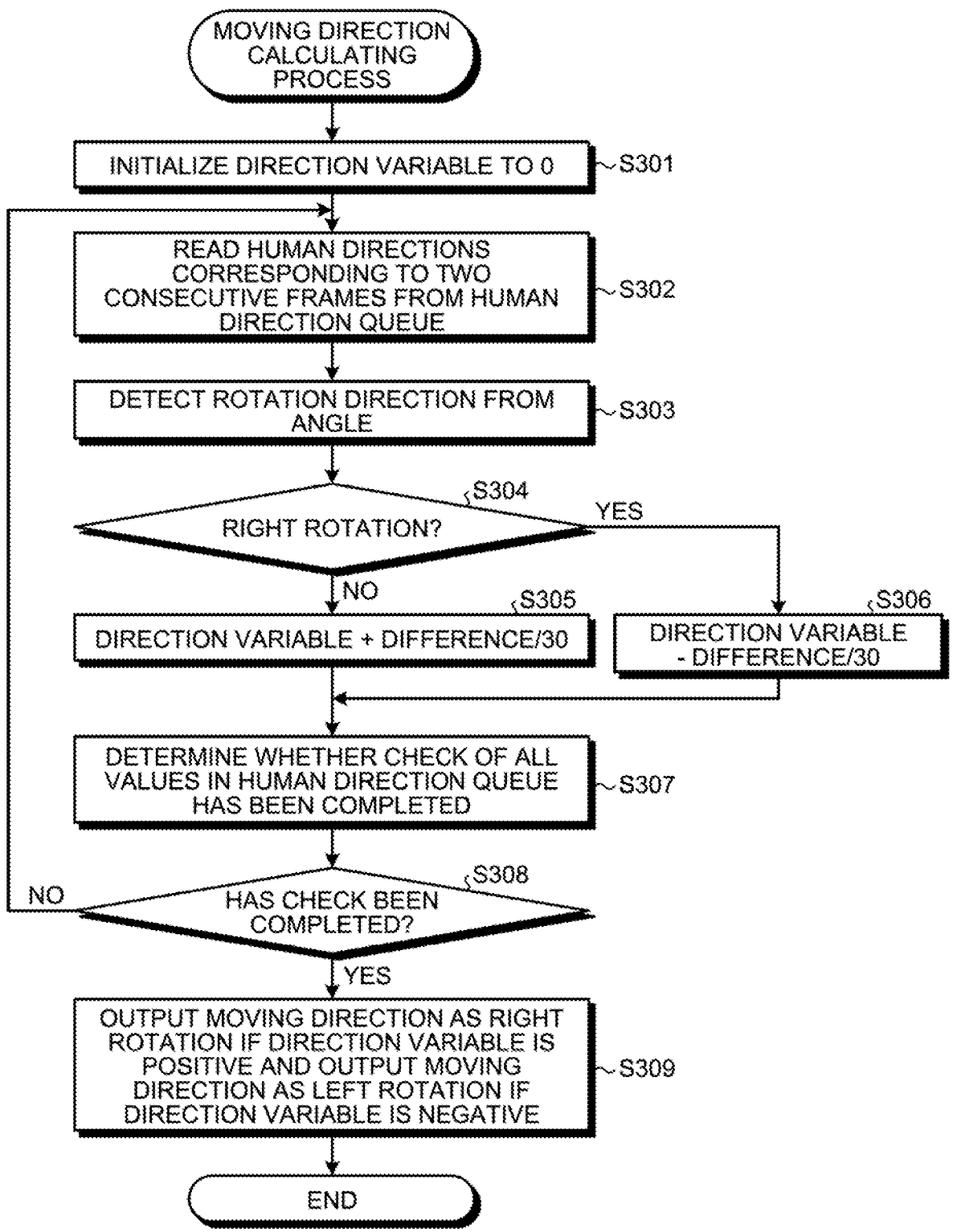
FIG. 22 is a flow chart illustrating processing procedures of a moving direction calculating process.

Described now is an example of the moving direction calculating process illustrated at Step S104b in FIG. 20. FIG. 22 is a flow chart illustrating processing procedures of the moving direction calculating process. As illustrated in FIG.

22, the movement estimating unit 144 of the recognition device 100 initializes a direction variable to 0 (Step S301). The movement estimating unit 144 reads human directions corresponding to two consecutive frames, from the human direction queue 134 (Step S302).

The movement estimating unit 144 detects a rotation direction from the angle (Step S303). If the rotation direction is rightward (Step S304, Yes), the movement estimating unit 144 updates the direction variable to "direction variable−difference/30" (Step S306). This difference corresponds to a difference between the human directions of the consecutive frames.

If the rotation direction is not rightward (Step S304, No), the movement estimating unit 144 updates the direction variable to "direction variable+difference/30" (Step S305).

The movement estimating unit 144 determines whether check of all values in the human direction queue 134 has been completed (Step S307). If the check of all values in the human direction queue 134 has not been completed (Step S308, No), the movement estimating unit 144 proceeds to Step S302.

On the contrary, if the check of all values in the human direction queue 134 has been completed (Step S308, Yes), the movement estimating unit 144 proceeds to Step S309. The movement estimating unit 144 outputs the moving direction as right rotation if the direction variable is positive, and outputs the moving direction as left rotation if the direction variable is negative (Step S309).

Figure 23:
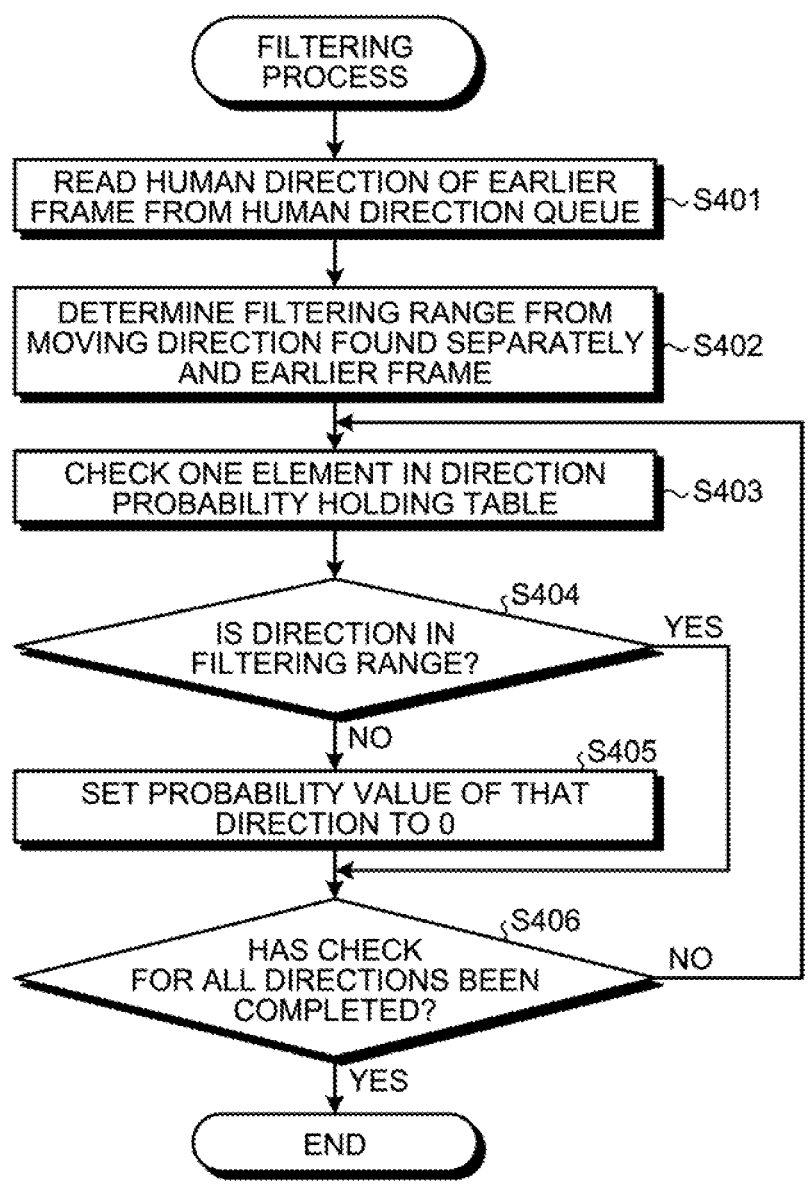
FIG. 23 is a flow chart illustrating processing procedures of the filtering process.

Described now is an example of the filtering process illustrated at Step S105b in FIG. 20. FIG. 23 is a flow chart illustrating processing procedures of the filtering process. As illustrated in FIG. 23, the third recognition unit 145 reads a human direction of an earlier frame from the human direction queue 134 (Step 3401).

The third recognition unit 145 determines a filtering range from a moving direction that has been found separately and the earlier frame (Step S402). The third recognition unit 145 checks one element in the direction probability holding table 133 (the second probability holding table 133b') (Step S403).

If the direction is in the filtering range (Step S404, Yes), the third recognition unit 145 proceeds to Step S406. If the direction is not in the filtering range (Step S404, No), the third recognition unit 145 sets the probability value for that direction to 0 (Step S405).

If check for all of the directions has not been completed (Step S406, No), the third recognition unit 145 proceeds to Step S403. On the contrary, if check for all of the directions has been completed (Step S406, Yes), the third recognition unit 145 ends the filtering process.

Figure 24:
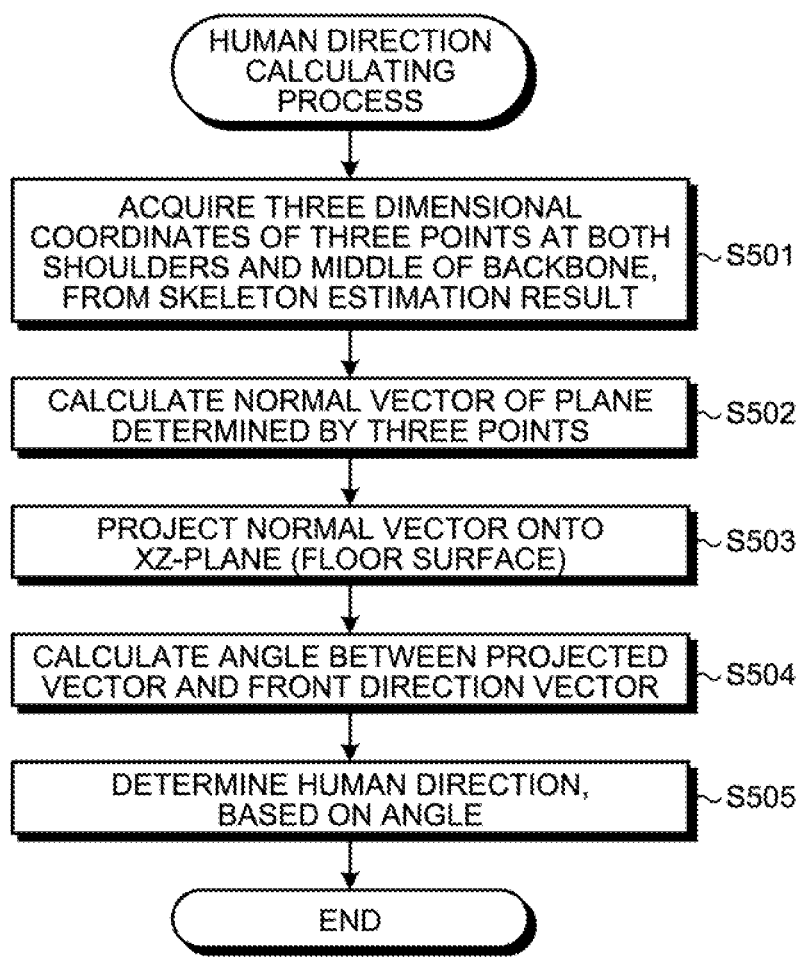
FIG. 24 is a flow chart illustrating processing procedures of a human direction calculating process.

Described now is an example of the moving direction calculating process illustrated at Step S109 in FIG. 20. FIG. 24 is a flow chart illustrating processing procedures of the human direction calculating process. As illustrated in FIG. 24, the third recognition unit 145 acquires three dimensional coordinates of three points at both shoulders and the middle of the backbone, from a skeleton estimation result (Step S501).

The third recognition unit 145 calculates a normal vector of a plane determined by the three points (Step S502). The third recognition unit 145 projects the normal vector onto the XZ plane (floor surface) (Step S503). The third recognition unit 145 calculates an angle between the projection vector and the front direction vector (Step S504). The third recognition unit 145 determines a human direction, based on the angle (Step S505).

Described next are effects of the recognition device 100 according to the first embodiment. Based on a range of human direction based on RGB image data, and a range of human direction based on distance data, the recognition device 100 determines a more probable human direction, and executes skeleton recognition, based on the determined human direction; and thus accuracy of recognition of skeletons of human bodies is able to be improved. For example, by use of recognition results according to, not only distance data, but also RGB image data, a direction is able to be recognized at a high probability through techniques such as detection of color information and faces, for angles in a diagonal direction, for which similar shapes are acquired in distance images, and for which determination is difficult.

For example, if the first conventional technique is simply applied to a conventional skeleton recognition system, a reference technique where based on a human direction, corresponding joint position data are used and skeleton recognition is performed may be considered. This reference technique is premised on accurate determination of the human direction, and thus if the determination of the human direction is unable to be performed correctly, the accuracy of the skeleton recognition is reduced. For example, if the human direction of the target person 6a is "front", skeleton recognition is desirably performed by use of joint positions corresponding to the human direction, "front". However, since the front and back, or the right and left, of a person are easily confused with each other, if a human direction is incorrectly determined to be "back", skeleton recognition will be performed by use of joint positions corresponding to the human direction, "back", and thus a correct result is unable to be acquired.

In contrast, the recognition device 100 according to the first embodiment adds a range in a diagonal direction, in addition to a range of human direction based on the second discriminator 132, into a range of human direction based on distance data, and performs final determination of a human direction. By addition of a candidate in a diagonal direction as described above, achieved is an effect that the possibility of acquisition of a correct result is increased even if the direction in the first direction recognition is wrong. This effect is more prominent particular in a case where a person faces various directions including forward, backward, leftward, rightward, upward, and downward directions, like in gymnastics where errors tend to occur.

Furthermore, the recognition device 100 according to the first embodiment determines a moving direction and a moving distance of the target person 6a, based on a history of past human directions, sets a filtering range serving as a moving range of the target person 6a, and excludes any human direction not included in the filtering range. Therefore, a human direction is able to be determined more accurately. That is, by feedback of a direction found from a final skeleton recognition result, the accuracy of the earlier frame position serving as the origin of filtering according to the moving direction and distance is improved, and as a result, an effect that the accuracy of the filtering result is improved is achieved. This is because: a result learnt from learning data of a narrow range is used in skeleton estimation, as compared to direction recognition by use of distance images and RGB where learning needs to be done by use of data for all directions; and thus the accuracy of positions of the skeleton and the direction found therefrom is increased.

Furthermore, the recognition device 100 enables the accuracy to be improved as compared to a case where learning is each performed in a narrow range, because the recognition unit is narrowed and the recognition range is widened and a learning result of a wide range is thereby used even if the direction recognition is mistaken a little.

According to the first embodiment, for example, the second recognition unit 143 executes the diagonal direction adding process and corrects the second recognition result, but the processing load may be reduced by a skip of the diagonal direction adding process.

Second Embodiment

Described next is other processing by the recognition device 100 according to a second embodiment. In the above described first embodiment, the recognition device 100 may further add a resupination direction when a human direction is determined. For example, a resupination direction corresponds to a direction of rotation of a target person about an axis along a horizontal direction.

Figure 25:
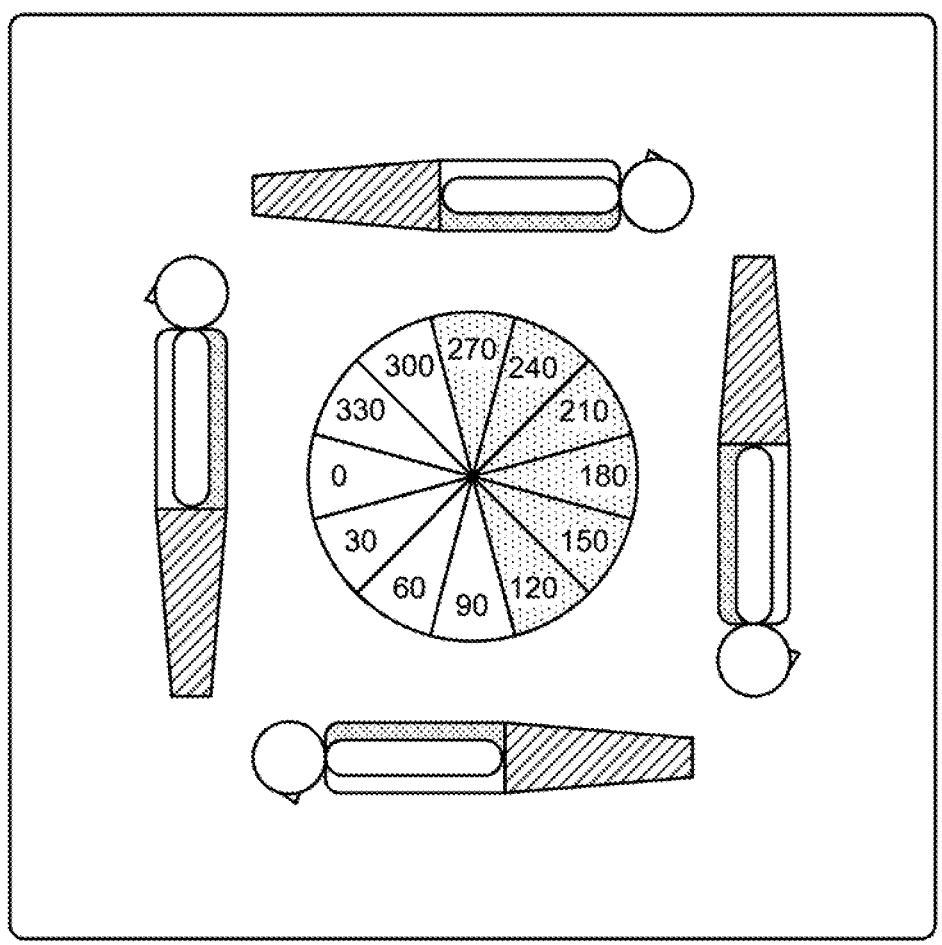
FIG. 25 is a diagram illustrating an example of definitions of divisions for resupination directions.

FIG. 25 is a diagram illustrating an example of definitions of divisions for resupination directions. As illustrated in FIG. 25, a state where the head of a target person is up and the target person is standing upright is defined as "0°", and a state where the target person is facing straightly downward is defined as "90°". Furthermore, a state where the target person is doing a handstand and the head is down is defined as "180°", and a state where the target person is facing straightly upward will be defined as "270°".

Figure 26:
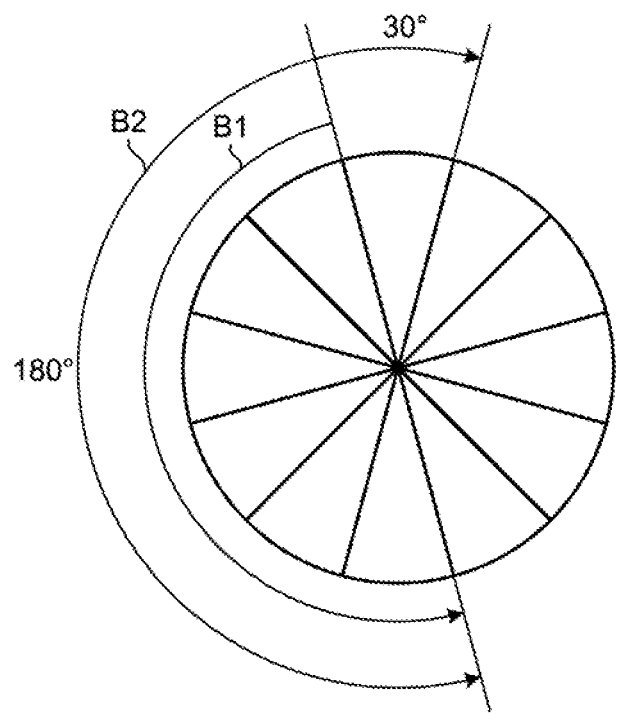
FIG. 26 is a first diagram illustrating an example of a recognition unit, a recognition range, and a learning range, for directions treated according to a second embodiment.
Figure 27:
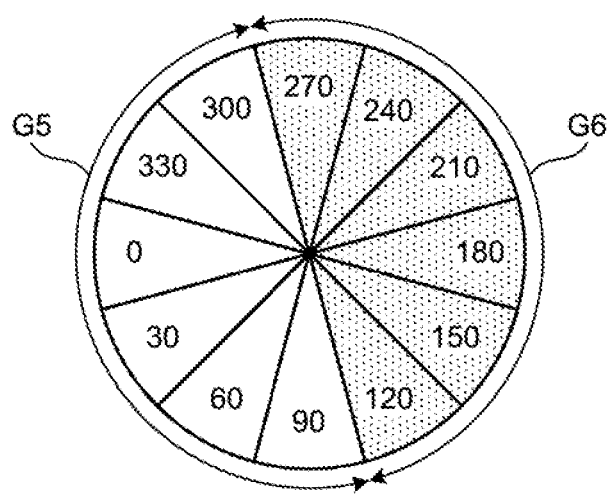
FIG. 27 is a second diagram illustrating the example of the recognition unit, the recognition range, and the learning range, for the directions treated according to the second embodiment.

FIG. 26 and FIG. 27 are diagrams illustrating an example of a recognition unit, a recognition range, and a learning range, for directions treated according to the second embodiment. As illustrated in FIG. 26, the recognition device 100 sets a recognition unit, a recognition range, and a learning range, for the resupination direction also. For example, the recognition unit is set to 30°, and a direction is recognized per unit (recognition range B1) resulting from division into two by 180°. Furthermore, for prevention of reduction in accuracy of skeleton recognition, the recognition device 100 performs learning by using data of a learning range B2. For example, the learning range B2 is a range of 210° that is wider upward by 30° than the recognition range B1.

As illustrated in FIG. 27, the recognition device 100 makes determination into either a group G5 where the head of the person is up, or a group G6 where the head of the person is down.

The first discriminator 131 associates human directions with feature values of the person in the RGB image data, the human directions having, in addition to the human directions, "front", "left", "back", and "right", described with respect to FIG. 3 and the like, resupination directions, "upward" and "downward", added therein. By comparing the RGB image data 11a with the first discriminator 131, the first recognition unit 142 identifies the human direction, "front", "left", "back", or "right", and the resupination direction, "upward" or "downward", of the person.

The second discriminator 132 associates the human directions with feature values of the person in the distance data, the human directions having, in addition to the human directions, "front", "left", "back", and "right", described with respect to FIG. 3 and the like, the resupination directions, "upward" and "downward", added therein. By comparing the distance data 11b with the second discriminator 132, the second recognition unit 143 recognizes the human direction, "front", "left", "back", or "right", and the resupination direction, "upward" or "downward", of the person. Furthermore, the second discriminator 132 executes the diagonal direction adding process for the recognition result with respect to the resupination directions, "upward" and "downward", of the person.

The movement estimating unit 144 estimates a moving direction and a moving distance of the resupination direction, similarly to the process where the moving direction and moving distance for the human direction, "front", "left", "back", or "right", is found.

The third recognition unit 145 executes a filtering process and a human direction recognition process, for the resupination direction of the person, and determines a final resupination direction of the person. The third recognition unit 145 acquires information on joint positions corresponding to the finally determined human direction and resupination direction of the person, from the skeleton dictionary data 135, and recognizes a skeleton of the target person 6a. The skeleton dictionary data 135 have, held therein, information on joint positions corresponding to combinations between: the human directions, "front", "left", "back", and "right"; and the resupination directions, "upward" and "downward", of the person.

As described above, by performing processing with a resupination direction added further in determining a human direction, the recognition device 100 is able to perform skeleton recognition more accurately for an object that moves in a complex manner.

Described next are examples of a system where the first or second embodiment is used. For example, a skeleton recognition result that is an output result from the recognition device 100 may be used as described below. For example, by calculation of an angle of each joint in frame units through use of a skeleton (three dimensional joint coordinates), scoring by a judge is able to be assisted. Realtime display is possible in broadcasting or the like by recognition of which skill is being performed realtime by use of positions of limbs determined by joint coordinates. By numeralization of joint angles and movements in training, training assistance or the like is able to be performed.

Figure 28:
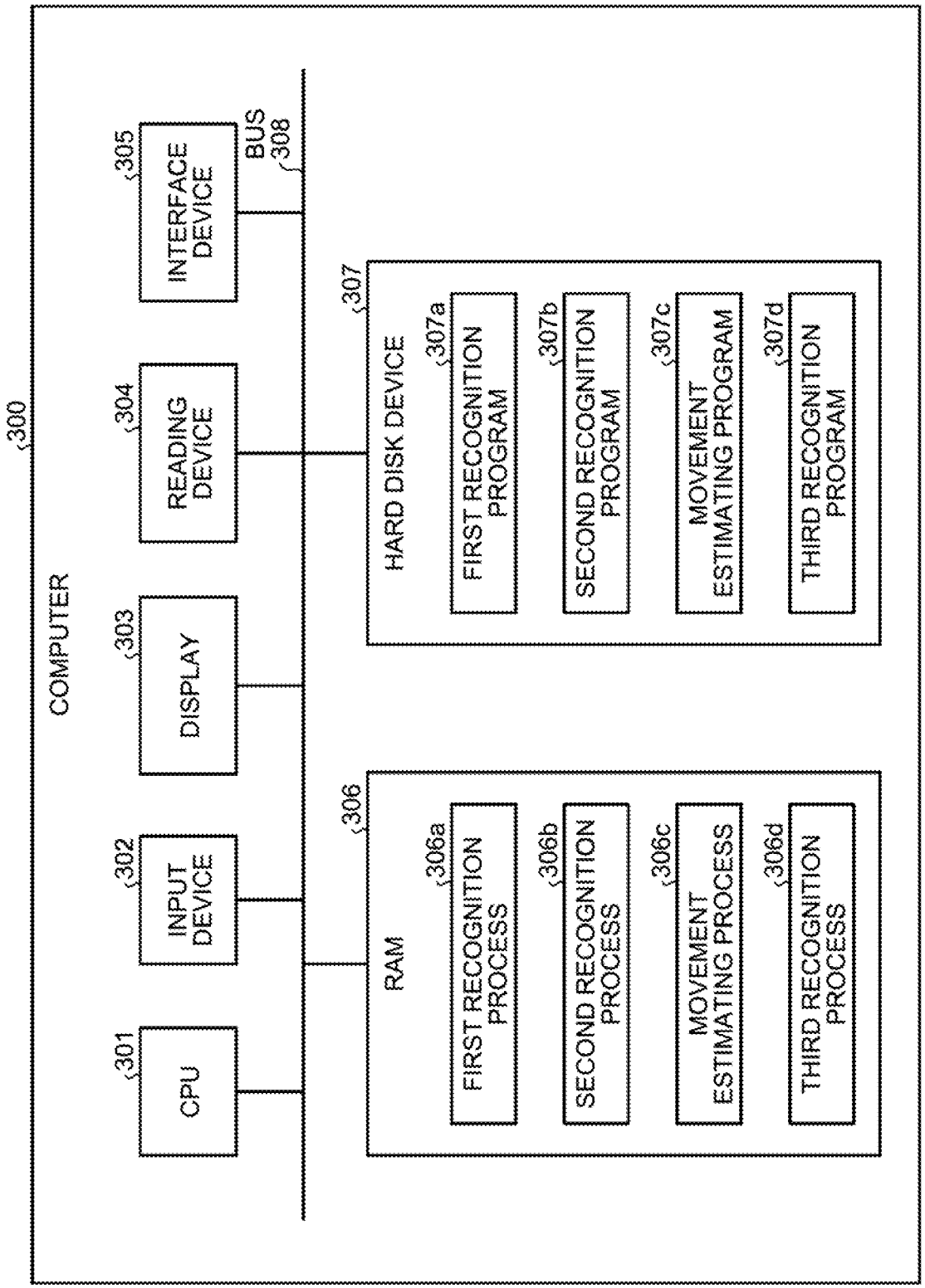
FIG. 28 is a diagram illustrating an example of a hardware configuration of a computer that realizes the same functions as those of a recognition device.
Figure 29:
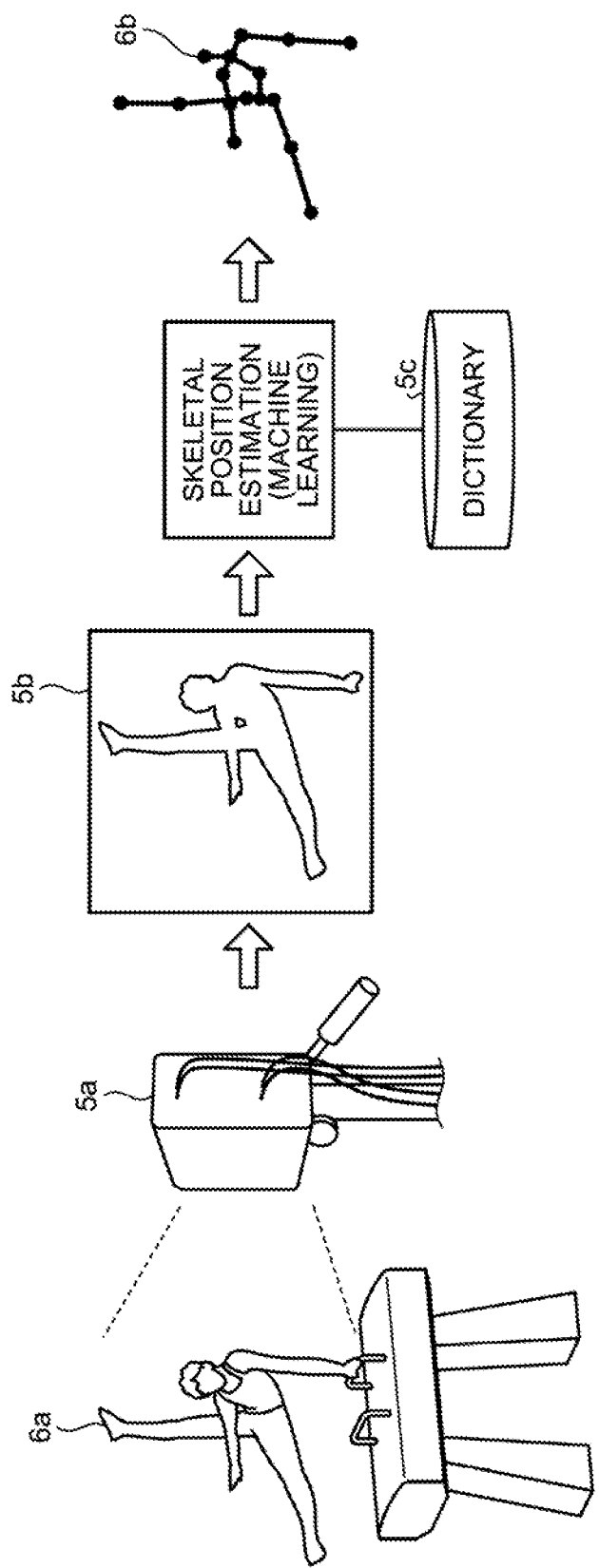
FIG. 29 is a diagram illustrating an example of a conventional skeleton recognition system.
Figure 30:
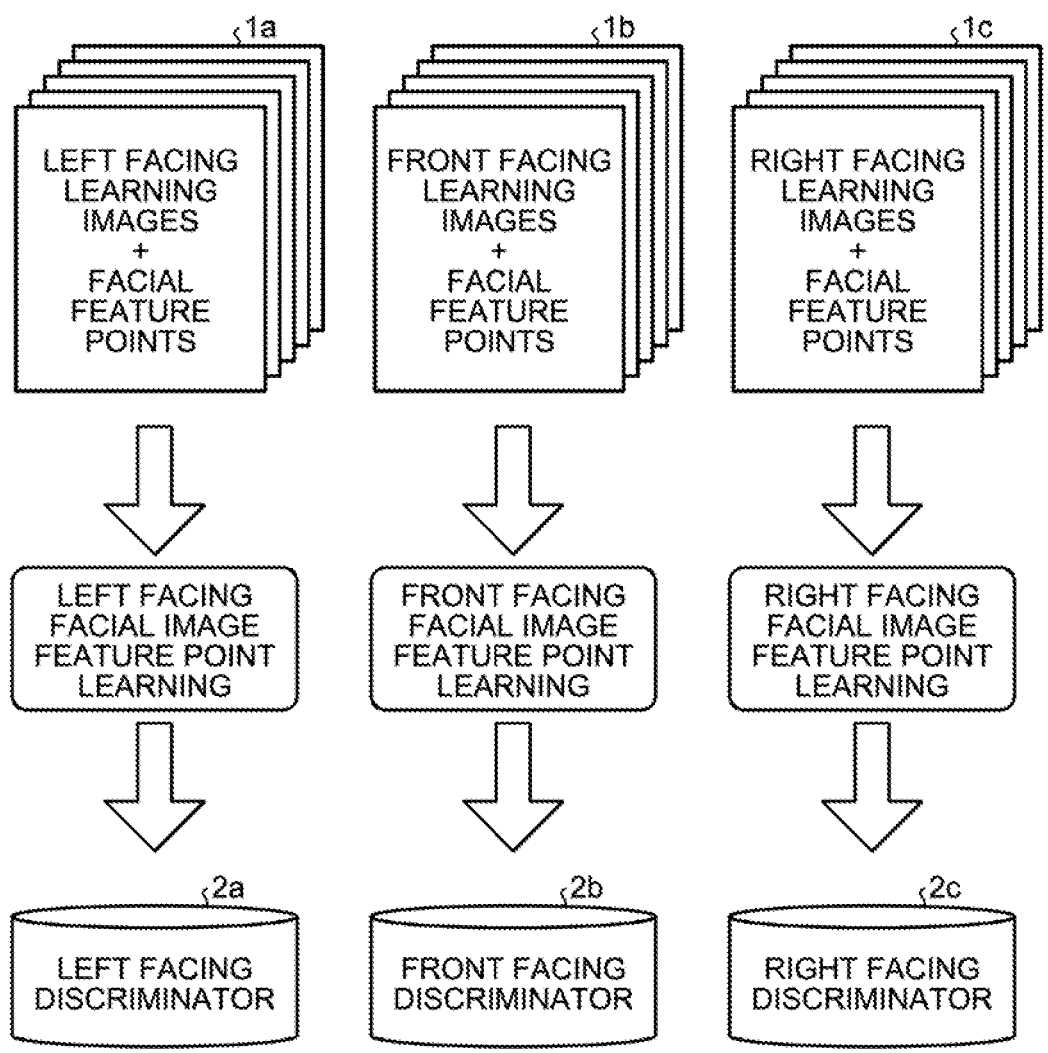
FIG. 30 is a diagram illustrating an example of learning of facial feature points according to the first conventional technique.

Described next is an example of a hardware configuration of a computer that realizes the same functions as those of the recognition device 100 described with respect to the embodiments above. FIG. 28 is a diagram illustrating the example of the hardware configuration of the computer that realizes the same functions as those of the recognition device.

As illustrated in FIG. 28, a computer 300 has: a CPU 301 that executes various types of arithmetic processing; an input device 302 that receives input of data from a user; and a display 303. Furthermore, the computer 300 has: a reading device 304 that reads a program or the like from a storage medium; and an interface device 305 that transfers data to and from another computer via a wired or wireless network. For example, the interface device 305 is connected to the RGB camera 10a, the distance sensor 10b, and the like. Moreover, the computer 300 has: a RAM 306 that temporarily stores therein various types of information; and a hard disk device 307. Each of these devices 301 to 307 is connected to a bus 308.

The hard disk device 307 has: a first recognition program 307a; a second recognition program 307b; a movement estimating program 307c; and a third recognition program 307d. The CPU 301 reads and loads the first recognition program 307a, the second recognition program 307b, the movement estimating program 307c, and the third recognition program 307d, into the RAM 306.

The first recognition program 307a functions as a first recognition process 306a. The second recognition program 307b functions as a second recognition process 306b. The movement estimating program 307c functions as a movement estimating process 306c. The third recognition program 307d functions as a third recognition process 306d.

Processing in the first recognition process 306a corresponds to the processing by the first recognition unit 142. Processing in the second recognition process 306b corresponds to the processing by the second recognition unit 143. Processing in the movement estimating process 306c corresponds to the processing by the movement estimating unit 144. Processing in the third recognition process 306d corresponds to the processing by the third recognition unit 145.

Each of these programs 306a to 307d is not necessarily stored initially in the hard disk device 307 beforehand. For example, each of these programs is stored in a "portable physical medium", such as a flexible disk (FD), a CD-ROM, a DVD disc, a magneto-optical disk, or an IC card; which is inserted in the computer 300. The computer 300 then may read and execute each of these programs 306a to 307d.

Recognition accuracy for skeletons of human bodies is able to be improved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A recognition device, comprising:
a memory that stores therein: a first discriminator associating each of features of a person included in image information, with a first range indicating a range of direction that a body of the person has possibility of facing; a second discriminator associating each of features of the person included in distance information, with a second range indicating a range of direction that the body of the person has possibility of facing; and a joint position dictionary associating directions that the body of the person faces, with joint positions of the person; and
a processor coupled to the memory and configured to:
acquire image information of a target person,
determine a first range corresponding to the image information of the target person, based on the first discriminator and a feature in the image information,
acquire distance information of the target person,
determine a second range corresponding to the distance information of the target person, based on the second discriminator and a feature in the distance information,
determine a direction that a body of the target person is facing, based on the first range and the second range, and
recognize a skeleton of the target person, based on the determined direction and the joint position dictionary.

2. The recognition device according to claim 1, wherein the processor is further configured to estimate a moving direction and a moving distance of the body of the target person, based on a queue holding therein information on directions that the body of the target person faces, the directions having been determined in the past, add a range in a direction diagonal to the determined second rage, to the second range, and determine a direction that the body of the target person is facing, based on the moving direction, the moving distance, the first range, and the second range.

3. The recognition device according to claim 2, wherein the processor is further configured to recognize a skeleton of the target person every time and determine a direction that the body of the target person is facing, from the skeleton of the target person, and stores a result of the determination in the queue.

4. The recognition device according to claim 1 wherein a direction of the body of the person is a direction of rotation about an axis along a vertical direction or a direction of rotation about an axis along a horizontal direction.

5. A recognition system comprising an imaging device, a distance sensor, and a recognition device, wherein
the imaging device outputs image information of a target person, to the recognition device,
the distance sensor outputs information on distance to the target person, to the recognition device, and
the recognition device comprises:
a memory that stores therein: a first discriminator associating each of features of a person included in image information, with a first range indicating a range of direction that a body of the person has possibility of facing; a second discriminator associating each of features of the person included in the distance information, with a second range indicating a range of direction that the body of the person has possibility of facing; and a joint position dictionary associating directions that the body of the person faces, with joint positions of the person; and
a processor coupled to the memory and configured to:
acquire image information of a target person,
determine a first range corresponding to the image information of the target person, based on the first discriminator and a feature in the image information,
acquire distance information of the target person,
determine a second range corresponding to the distance information of the target person, based on the second discriminator and a feature in the distance information,
determine a direction that a body of the target person is facing, based on the first range and the second range, and
recognize a skeleton of the target person, based on the determined direction and the joint position dictionary.

6. A recognition method executed by a processor, the recognition method comprising:
acquiring image information of a target person;
first determining a first range corresponding to the image information of the target person, based on a first discriminator and a feature in the image information wherein the first discriminator associates each of features of a person included in image information, with a first range indicating a range of direction that a body of the person has possibility of facing;
acquiring distance information of the target person;
second determining a second range corresponding to the distance information of the target person, based on a second discriminator and a feature in the distance information wherein the second discriminator associates each of features of the person included in distance information, with a second range indicating a range of direction that the body of the person has possibility of facing;
third determining a direction that a body of the target person is facing, based on the first range and the second range; and recognizing a skeleton of the target person, based on the determined direction and a joint position dictionary wherein the joint position dictionary associates directions that the body of the person faces, with joint positions of the person.

7. The recognition method according to claim 6, wherein the recognition method further comprises:
estimating a moving direction and a moving distance of the body of the target person, based on a queue holding therein information on directions that the body of the target person faces, the directions having been determined in the past; wherein
the third determining adds a range of direction diagonal to the second range, to the second range, and determines a direction that the body of the target person is facing, based on the moving direction, the moving distance, the first range, and the second range.

8. The recognition method according to claim 7, wherein every time the recognizing recognizes a skeleton of the target person, the third determining determines a direction that the body of the target person is facing, from the skeleton of the target person, and stores a result of the determination in the queue.

9. The recognition method according to claim 6 wherein a direction of the body of the person is a direction of rotation about an axis along a vertical direction or a direction of rotation about an axis along a horizontal direction.

\* \* \* \* \*